United States Patent
Yang et al.

(10) Patent No.: US 10,149,292 B2
(45) Date of Patent: Dec. 4, 2018

(54) SYSTEMS AND METHODS FOR EFFICIENT RESOURCE ALLOCATION IN WIRELESS COMMUNICATION NETWORKS

(71) Applicant: QUALCOMM Incorporated, San Diego, CA (US)

(72) Inventors: Lin Yang, San Diego, CA (US); Jialing Li Chen, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 14/863,021

(22) Filed: Sep. 23, 2015

(65) Prior Publication Data

US 2016/0088600 A1   Mar. 24, 2016

Related U.S. Application Data

(60) Provisional application No. 62/054,779, filed on Sep. 24, 2014.

(51) Int. Cl.
*H04W 72/04* (2009.01)
*H04L 27/26* (2006.01)
(Continued)

(52) U.S. Cl.
CPC .............. *H04W 72/044* (2013.01); *H04L 5/00* (2013.01); *H04L 27/26* (2013.01); *H04W 72/04* (2013.01); *H04W 84/12* (2013.01)

(58) Field of Classification Search
CPC ............................ H04W 72/044; H04W 84/12
See application file for complete search history.

(56) References Cited

U.S. PATENT DOCUMENTS

2009/0016456 A1   1/2009  Li et al.
2010/0329365 A1*  12/2010 Li .................... H04L 5/0007
                                                          375/259

(Continued)

FOREIGN PATENT DOCUMENTS

WO   WO-2008052001 A2   5/2008
WO   WO-2012122119 A1   9/2012

OTHER PUBLICATIONS

International Search Report and Written Opinion—PCT/US2015/052006—ISA/EPO—Dec. 15, 2015.

*Primary Examiner* — Robert M Morlan
*Assistant Examiner* — Pamit Kaur
(74) *Attorney, Agent, or Firm* — Knobbe, Martens, Olson & Bear, LLP

(57) ABSTRACT

Methods and apparatus for communicating over a wireless communication network are disclosed herein. One method includes determining a total bandwidth for a transmission of a message according to a first specification, the total bandwidth including a plurality of tones, wherein a portion of the total bandwidth is occupied by a transmission according to a second specification different from the first specification. The method further includes logically dividing a plurality of useable tones into a plurality of resource units and determining an indication, the indication assigning and channel bonding at least two of the plurality of resource units to a wireless communication device of a plurality of wireless communication devices, wherein the indication does not assign the portion of the total bandwidth that is occupied by the transmission according to the second specification.

28 Claims, 17 Drawing Sheets

(51) Int. Cl.
*H04L 5/00* (2006.01)
*H04W 84/12* (2009.01)

(56) References Cited

U.S. PATENT DOCUMENTS

2011/0255620 A1* 10/2011 Jones, IV .............. H04L 5/0046
 375/260
2015/0146653 A1* 5/2015 Zhang ................... H04L 5/0041
 370/329

* cited by examiner

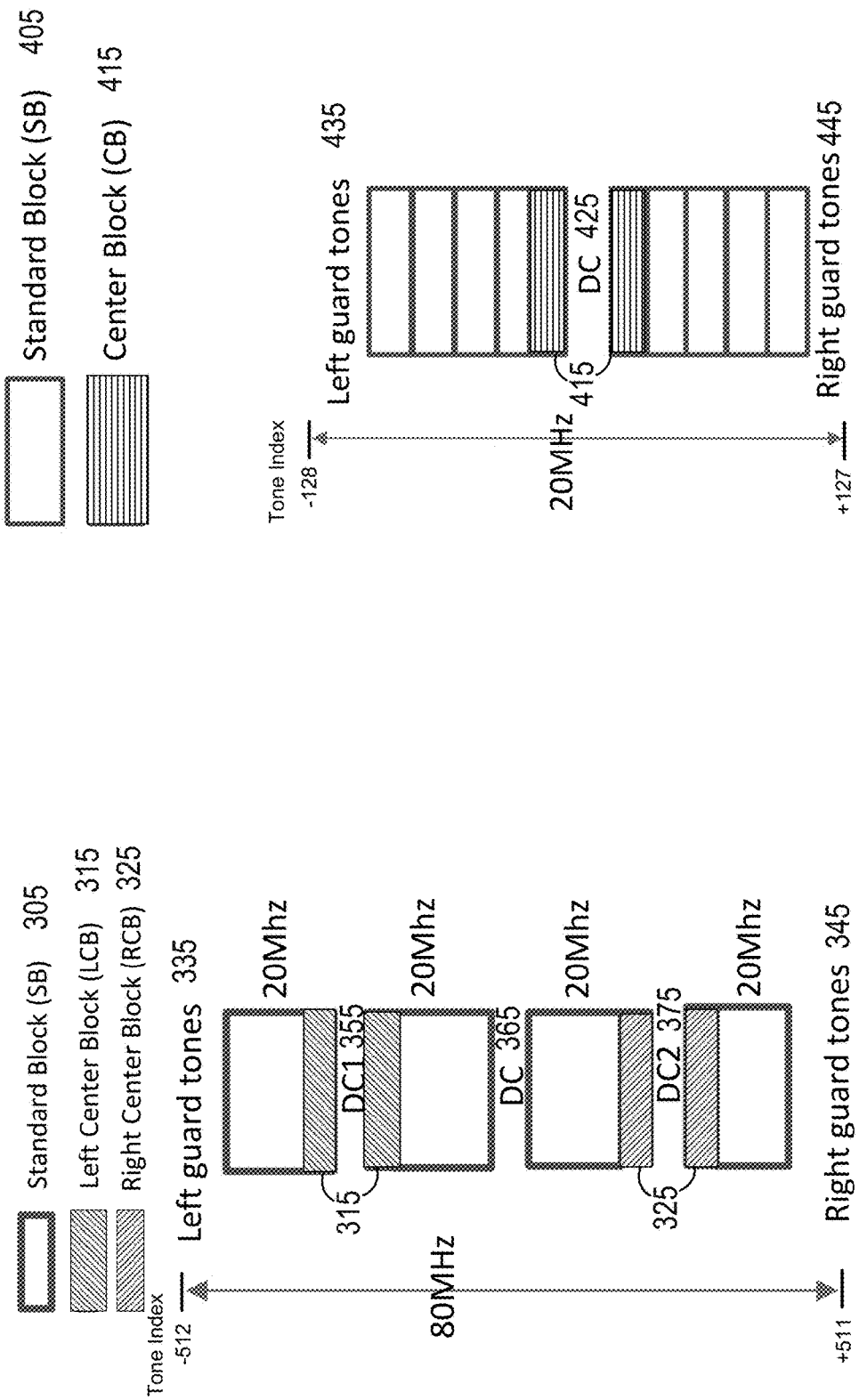

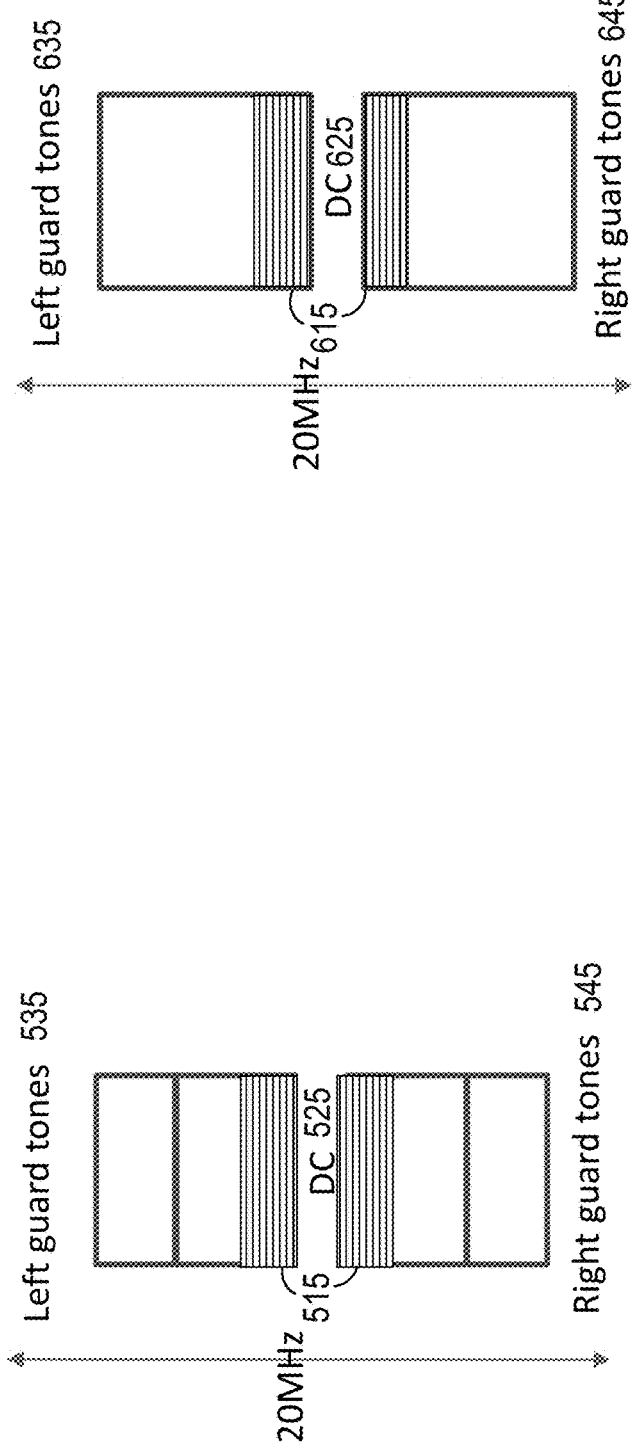
FIG. 6
FIG. 5

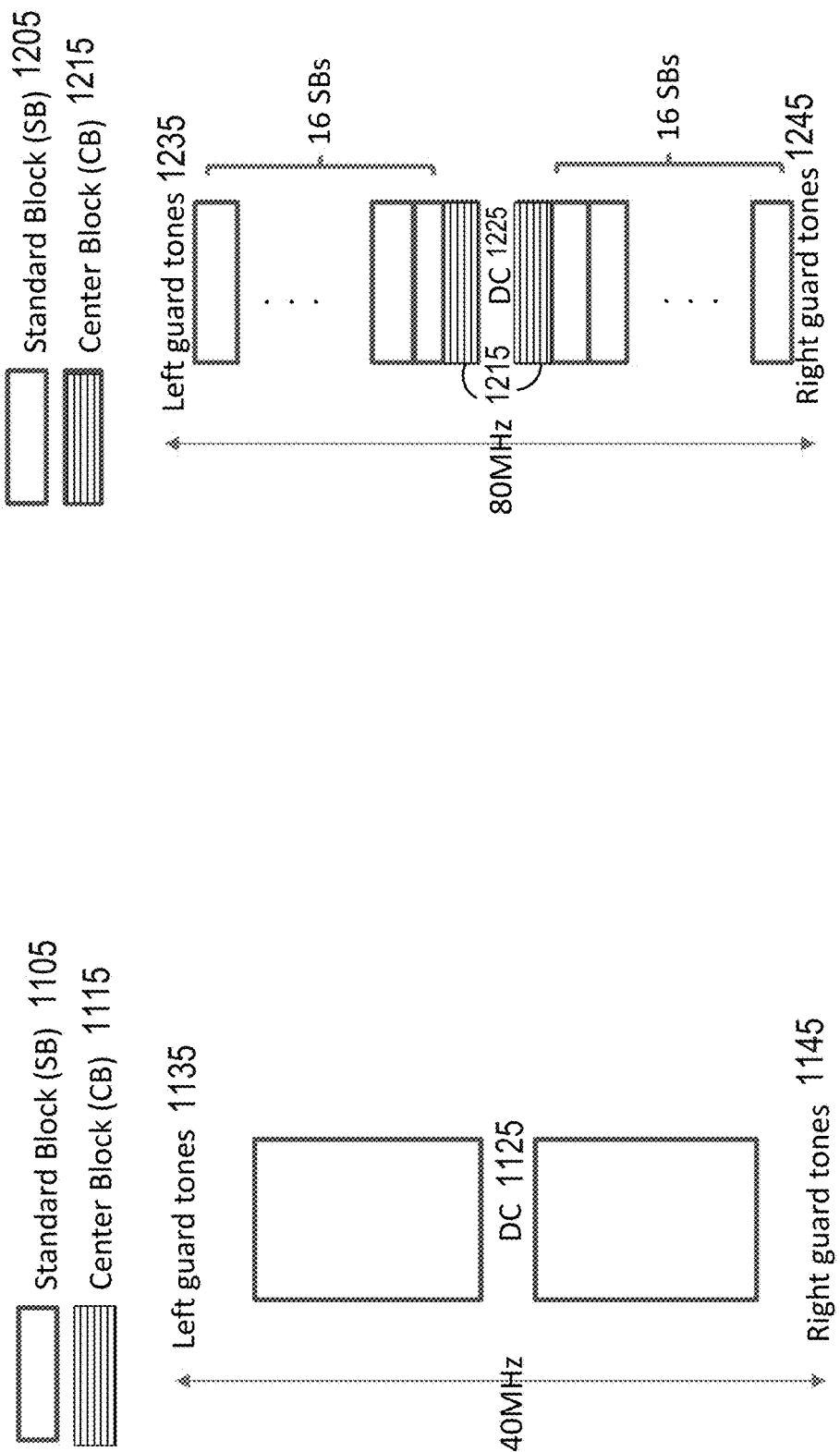

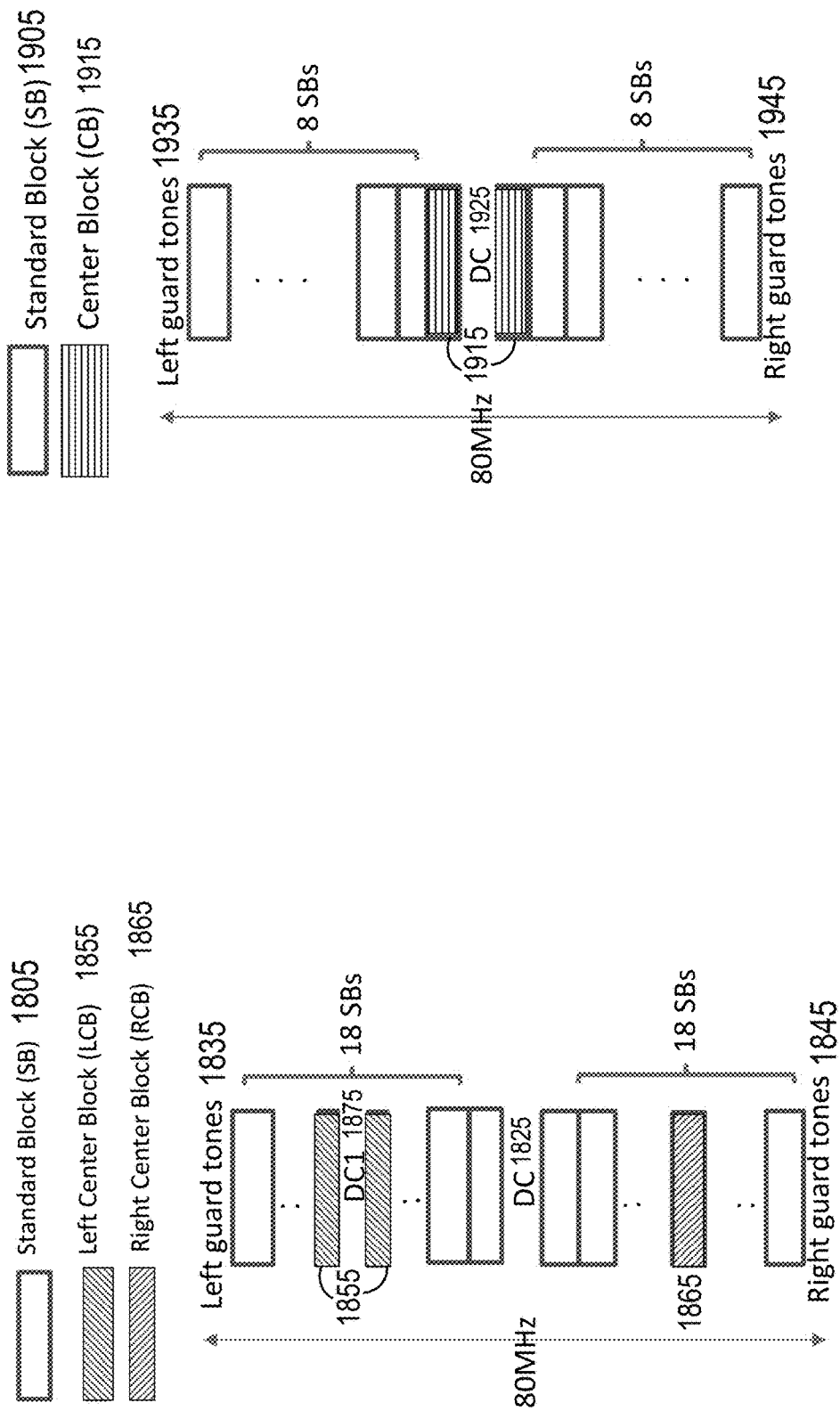

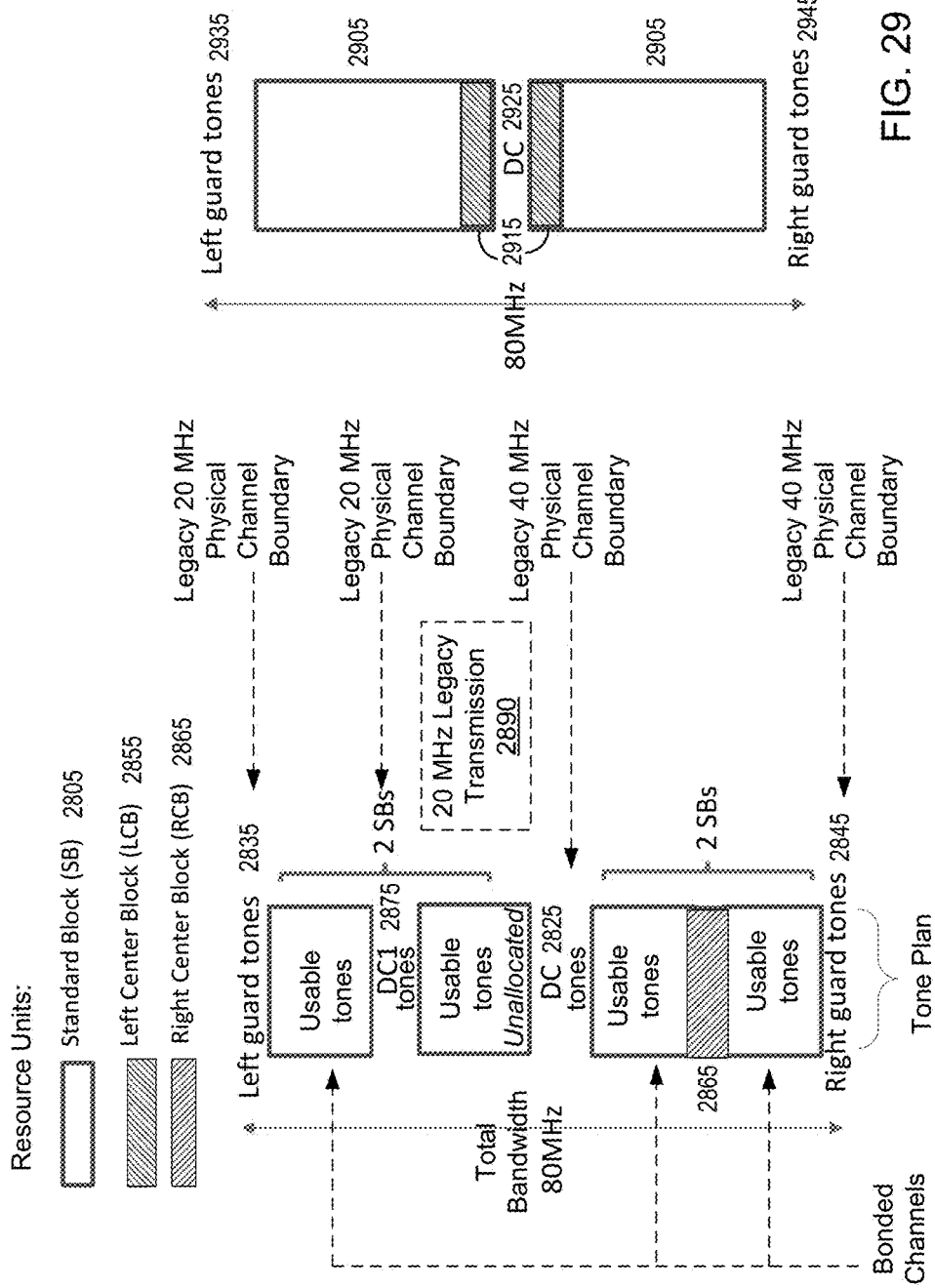

SYSTEMS AND METHODS FOR EFFICIENT RESOURCE ALLOCATION IN WIRELESS COMMUNICATION NETWORKS

PRIORITY CLAIM

This application claims priority under 35 U.S.C. § 119(e) to U.S. Provisional App. No. 62/054,779, filed Sep. 24, 2014, which is incorporated by reference herein in its entirety.

FIELD

Certain aspects of the present disclosure generally relate to wireless communications, and more particularly, to methods and apparatus for providing messages according to various tone plans.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of communicating over a wireless communication network. The method includes determining a total bandwidth for a transmission of a message according to a first specification, the total bandwidth comprising a plurality of tones. A portion of the total bandwidth is occupied by a transmission according to a second specification different from the first specification. The method further includes logically dividing the plurality of tones into a plurality of useable tones and into a plurality of guard tones and a plurality of direct current tones, to form a tone plan that preserves at least one physical boundary according to the second specification, logically dividing the plurality of useable tones into a plurality of resource units, determining an indication, the indication assigning and channel bonding at least two of the plurality of resource units to a wireless communication device of a plurality of wireless communication devices. The indication does not assign the portion of the total bandwidth that is occupied by the transmission according to the second specification. The method further includes transmitting the indication to the plurality of wireless communication devices.

In various embodiments, the first specification can include an Institute of Electrical and Electronics Engineers (IEEE) 802.11ax specification and the second specification can include a different IEEE 802.11 specification. In various embodiments, logically dividing the plurality of tones can include assigning sufficient guard tones to preserve physical 20 MHz and/or 40 MHz boundaries. In various embodiments, logically dividing the plurality of tones can include assigning 11 direct current or guard tones at 20 MHz and/or 40 MHz boundaries. In various embodiments, logically dividing the plurality of useable tones can include assigning resource units that preserve physical 20 MHz and/or 40 MHz boundaries.

In some aspects, the plurality of direct current tones may include tones allocated as direct current tones in an 80 MHz transmission, the tones in a group centered on one of tone index −256 or tone index 256. Logically dividing the plurality of useable tones into a plurality of resource units may include allocating a number of tones in the plurality of tones that are not in any resource unit into one or more of a center block, a left center block, and a right center block. The indication may further assign at least a portion of one of a center block, a left center block, and a right center block to the wireless communication device of the plurality of wireless communication devices. Tones from one or more of the center block, the left center block, and the right center block may be used for channel control.

In some aspects, the total bandwidth may be 20 MHz, the plurality of guard tones may comprise 11 tones, the plurality of direct current tones may comprise 11 tones, and wherein logically dividing the plurality of useable tones may include logically dividing the plurality of useable tones into 8 resource units, each resource unit having 26 tones, and allocating 26 tones in the plurality of tones that are not in any resource unit into a center block. In some aspects, the total bandwidth may be 20 MHz, the plurality of guard tones may include 11 tones, the plurality of direct current tones may include 7 tones, and wherein logically dividing the plurality of useable tones may include logically dividing the plurality of useable tones into 4 resource units, each resource unit having 56 tones, and allocating 14 tones in the plurality of tones that are not in any resource unit into a center block. In some aspects, the total bandwidth may be 20 MHz, the plurality of guard tones may include 11 or 9 tones, the plurality of direct current tones may include 3 or 5 tones, and wherein logically dividing the plurality of useable tones may include logically dividing the plurality of useable tones into 2 resource units, each resource unit having 114 tones, and allocating 14 tones in the plurality of tones that are not in any resource unit into a center block.

In some aspects, the total bandwidth may be 40 MHz, the plurality of guard tones may include 15 tones, the plurality of direct current tones may include 11 tones, and wherein logically dividing the plurality of useable tones may include logically dividing the plurality of useable tones into 16 resource units, each resource unit having 26 tones, and allocating 70 tones in the plurality of tones that are not in any resource unit into a center block. In some aspects, the total bandwidth may be 40 MHz, the plurality of guard tones may include 19 or 17 or 15 tones, the plurality of direct current tones may include 11 or 13 or 15 tones, and wherein logically dividing the plurality of useable tones may include logically dividing the plurality of useable tones into 18 resource units, each resource unit having 26 tones, and allocating 14 tones in the plurality of tones that are not in any resource unit into a center block. In some aspects, the total bandwidth may be 40 MHz, the plurality of guard tones may include 11 tones, the plurality of direct current tones may include 11 tones, and wherein logically dividing the plurality of useable tones may include logically dividing the plurality of useable tones into 8 resource units, each resource unit having 56 tones, and allocating 42 tones in the plurality of tones that are not in any resource unit into a center block.

In some aspects, the total bandwidth may be 40 MHz, the plurality of guard tones may include 17 tones, the plurality of direct current tones may include 11 tones, and wherein logically dividing the plurality of useable tones may include logically dividing the plurality of useable tones into 4 resource units, each resource unit having 114 tones, and allocating 28 tones in the plurality of tones that are not in any resource unit into a center block. In some aspects, the total bandwidth may be 40 MHz, the plurality of guard tones may include 17 tones, the plurality of direct current tones may include 11 tones, and wherein logically dividing the plurality of useable tones may include logically dividing the plurality of useable tones into 2 resource units, each resource unit having 242 tones. In some aspects, the total bandwidth may be 80 MHz, the plurality of guard tones may include 11 tones, the plurality of direct current tones may include 11 tones, and wherein logically dividing the plurality of useable tones may include logically dividing the plurality of useable tones into 32 resource units, each resource unit having 26 tones, and allocating 170 tones in the plurality of tones that are not in any resource unit into a center block. In some aspects, the total bandwidth may be 80 MHz, the plurality of guard tones may include 11 tones, the plurality of direct current tones may include 11 tones, and wherein logically dividing the plurality of useable tones may include logically dividing the plurality of useable tones into 38 resource units, each resource unit having 26 tones, and allocating 14 tones in the plurality of tones that are not in any resource unit into a center block.

In some aspects, the total bandwidth may be 80 MHz, the plurality of guard tones may include 15 or 14 tones, the plurality of direct current tones may include 15 or 14 direct current tones and 11 tones positioned around tone index −256 and 11 tones positioned around tone index 256, and wherein logically dividing the plurality of useable tones may include logically dividing the plurality of useable tones into 32 resource units, each resource unit having 26 tones, and allocating 70 or 71 tones in the plurality of tones that are not in any resource unit into a left center block and 70 or 71 tones in the plurality of tones that are not in any resource unit into a right center block. In some aspects, the total bandwidth may be 80 MHz, the plurality of guard tones may include 11 tones, the plurality of direct current tones may include 11 direct current tones and 15 or 14 tones positioned around tone index −256 and 15 or 14 tones positioned around tone index 256, and wherein logically dividing the plurality of useable tones may include logically dividing the plurality of useable tones into 32 resource units, each resource unit having 26 tones, and allocating 70 or 71 tones in the plurality of tones that are not in any resource unit into a left center block and 70 or 71 tones in the plurality of tones that are not in any resource unit into a right center block. In some aspects, the total bandwidth may be 80 MHz, the plurality of guard tones may include 13 tones, the plurality of direct current tones may include 11 direct current tones and 11 tones positioned around tone index −256 and 11 tones positioned around tone index 256, and wherein logically dividing the plurality of useable tones may include logically dividing the plurality of useable tones into 36 resource units, each resource unit having 26 tones, and allocating 21 tones in the plurality of tones that are not in any resource unit into a left center block and 21 tones in the plurality of tones that are not in any resource unit into a right center block.

In some aspects, the total bandwidth may be 80 MHz, the plurality of guard tones may include 15 or 13 tones, the plurality of direct current tones may include 11 or 13 direct current tones and 11 tones positioned around tone index −256 and 11 tones positioned around tone index 256, and wherein logically dividing the plurality of useable tones may include logically dividing the plurality of useable tones into 36 resource units, each resource unit having 26 tones, and allocating 20 tones in the plurality of tones that are not in any resource unit into a left center block and 20 tones in the plurality of tones that are not in any resource unit into a right center block. In some aspects, the total bandwidth may be 80 MHz, the plurality of guard tones may include 15 tones, the plurality of direct current tones may include 15 direct current tones and 15 tones positioned around tone index −256 and 15 tones positioned around tone index 256, and wherein logically dividing the plurality of useable tones may include logically dividing the plurality of useable tones into 36 resource units, each resource unit having 26 tones, and allocating 14 tones in the plurality of tones that are not in any resource unit into a left center block and 14 tones in the plurality of tones that are not in any resource unit into a right center block. In some aspects, the total bandwidth may be 80 MHz, the plurality of guard tones may include 15 tones, the plurality of direct current tones may include 14 direct current tones and 11 tones positioned around tone index −256 or around tone index 256, and wherein logically dividing the plurality of useable tones may include logically dividing the plurality of useable tones into 32 resource units, each resource unit having 26 tones, and allocating 70 or 82 tones in the plurality of tones that are not in any resource unit into a left center block and 82 or 70 tones in the plurality of tones that are not in any resource unit into a right center block.

In some aspects, the total bandwidth may be 80 MHz, the plurality of guard tones may include 12 tones, the plurality of direct current tones may include 11 direct current tones and 11 tones positioned around tone index −256 or around tone index 256, and wherein logically dividing the plurality of useable tones may include logically dividing the plurality of useable tones into 37 resource units, each resource unit having 26 tones, and allocating 21 or 7 tones in the plurality of tones that are not in any resource unit into a left center block and 7 or 21 tones in the plurality of tones that are not in any resource unit into a right center block. In some aspects, the total bandwidth may be 80 MHz, the plurality of guard tones may include 12 tones, the plurality of direct current tones may include 12 direct current tones and 12 tones positioned around tone index −256 or around tone index 256, and wherein logically dividing the plurality of useable tones may include logically dividing the plurality of useable tones into 37 resource units, each resource unit having 26 tones, and allocating 20 or 6 tones in the plurality of tones that are not in any resource unit into a left center block and 6 or 20 tones in the plurality of tones that are not in any resource unit into a right center block. In some aspects, the total bandwidth may be 80 MHz, the plurality of guard tones may include 12 tones, the plurality of direct current tones may include 12 direct current tones and 12 tones positioned around tone index −256 or around tone index 256, and wherein logically dividing the plurality of useable tones may include logically dividing the plurality of useable tones into 36 resource units, each resource unit having 26 tones, and allocating 20 or 32 tones in the plurality of tones that are not in any resource unit into a left center block and 32 or 20 tones in the plurality of tones that are not in any resource unit into a right center block.

In some aspects, the total bandwidth may be 80 MHz, the plurality of guard tones may include 13 or 11 tones, the plurality of direct current tones may include 11 or 13 direct current tones, and wherein logically dividing the plurality of useable tones may include logically dividing the plurality of useable tones into 16 resource units, each resource unit having 56 tones, and allocating 104 tones in the plurality of tones that are not in any resource unit into a center block. In some aspects, the total bandwidth may be 80 MHz, the plurality of guard tones may include 15 tones, the plurality of direct current tones may include 15 direct current tones, and wherein logically dividing the plurality of useable tones may include logically dividing the plurality of useable tones into 16 resource units, each resource unit having 56 tones, and allocating 98 tones in the plurality of tones that are not in any resource unit into a center block. In some aspects, the total bandwidth may be 80 MHz, the plurality of guard tones may include 11 tones, the plurality of direct current tones may include 11 direct current tones and 11 tones positioned around tone index −256 and 11 tones positioned around tone index 256, and wherein logically dividing the plurality of useable tones may include logically dividing the plurality of useable tones into 16 resource units, each resource unit having 56 tones, and allocating 42 tones in the plurality of tones that are not in any resource unit into a left center block and 42 tones in the plurality of tones that are not in any resource unit into a right center block.

In some aspects, the total bandwidth may be 80 MHz, the plurality of guard tones may include 13 or 11 tones, the plurality of direct current tones may include 11 direct current tones and 11 tones positioned around tone index −256 and 11 tones positioned around tone index 256, and wherein logically dividing the plurality of useable tones may include logically dividing the plurality of useable tones into 16 resource units, each resource unit having 56 tones, and allocating 41 tones in the plurality of tones that are not in any resource unit into a left center block and 41 tones in the plurality of tones that are not in any resource unit into a right center block. In some aspects, the total bandwidth may be 80 MHz, the plurality of guard tones may include 12 tones, the plurality of direct current tones may include 11 direct current tones and 11 tones positioned around tone index −256 or around tone index 256, and wherein logically dividing the plurality of useable tones may include logically dividing the plurality of useable tones into 16 resource units, each resource unit having 56 tones, and allocating 42 or 52 tones in the plurality of tones that are not in any resource unit into a left center block and 52 or 42 tones in the plurality of tones that are not in any resource unit into a right center block.

In some aspects, the total bandwidth may be 80 MHz, the plurality of guard tones may include 13 tones, the plurality of direct current tones may include 12 direct current tones and 11 tones positioned around tone index −256 or around tone index 256, and wherein logically dividing the plurality of useable tones may include logically dividing the plurality of useable tones into 16 resource units, each resource unit having 56 tones, and allocating 41 or 42 or 51 or 50 tones in the plurality of tones that are not in any resource unit into a left center block and 51 or 50 or 41 or 42 tones in the plurality of tones that are not in any resource unit into a right center block. In some aspects, the total bandwidth may be 80 MHz, the plurality of guard tones may include 14 tones, the plurality of direct current tones may include 14 direct current tones, and wherein logically dividing the plurality of useable tones may include logically dividing the plurality of useable tones into 8 resource units, each resource unit having 114 tones, and allocating 84 tones in the plurality of tones that are not in any resource unit into a center block. In some aspects, the total bandwidth may be 80 MHz, the plurality of guard tones may include 15 tones, the plurality of direct current tones may include 15 direct current tones, and wherein logically dividing the plurality of useable tones may include logically dividing the plurality of useable tones into 8 resource units, each resource unit having 114 tones, and allocating 82 tones in the plurality of tones that are not in any resource unit into a center block. In some aspects, the total bandwidth may be 80 MHz, the plurality of guard tones may include 13 or 11 tones, the plurality of direct current tones may include 11 or 13 direct current tones and 11 tones positioned around tone index −256 and 11 tones positioned around tone index 256, and wherein logically dividing the plurality of useable tones may include logically dividing the plurality of useable tones into 8 resource units, each resource unit having 114 tones, and allocating 33 tones in the plurality of tones that are not in any resource unit into a left center block and 33 tones in the plurality of tones that are not in any resource unit into a right center block. In some aspects, the total bandwidth may be 80 MHz, the plurality of guard tones may include 14 or 17 tones, the plurality of direct current tones may include 14 or 13 direct current tones and 14 or 13 tones positioned around tone index −256 and 14 or 13 tones positioned around tone index 256, and wherein logically dividing the plurality of useable tones may include logically dividing the plurality of useable tones into 8 resource units, each resource unit having 114 tones, and allocating 28 tones in the plurality of tones that are not in any resource unit into a left center block and 28 tones in the plurality of tones that are not in any resource unit into a right center block.

In some aspects, the total bandwidth may be 80 MHz, the plurality of guard tones may include 12 tones, the plurality of direct current tones may include 11 direct current tones and 11 tones positioned around tone index −256 or around tone index 256, and wherein logically dividing the plurality of useable tones may include logically dividing the plurality of useable tones into 8 resource units, each resource unit having 114 tones, and allocating 34 or 44 tones in the plurality of tones that are not in any resource unit into a left center block and 44 or 34 tones in the plurality of tones that are not in any resource unit into a right center block. In some aspects, the total bandwidth may be 80 MHz, the plurality of guard tones may include 14 tones, the plurality of direct current tones may include 14 direct current tones, and wherein logically dividing the plurality of useable tones may include logically dividing the plurality of useable tones into 4 resource units, each resource unit having 242 tones, and allocating 28 tones in the plurality of tones that are not in any resource unit into a center block. In some aspects, the total bandwidth may be 80 MHz, the plurality of guard tones may include 15 tones, the plurality of direct current tones may include 15 direct current tones, and wherein logically dividing the plurality of useable tones may include logically dividing the plurality of useable tones into 4 resource units, each resource unit having 242 tones, and allocating 26 tones in the plurality of tones that are not in any resource unit into a center block. In some aspects, the total bandwidth may be 80 MHz, the plurality of guard tones may include 14 tones, the plurality of direct current tones may include 14 direct current tones and 14 tones positioned around tone index −256 and 14 tones positioned around tone index 256, and wherein logically dividing the plurality of useable tones may include logically dividing the plurality of useable tones into 4 resource units, each resource unit having 242 tones. In some aspects, the total bandwidth may be 80 MHz, the plurality of guard tones may include 11 tones, the plurality of direct current tones may include 9 direct current tones and 11 tones positioned around tone index −256 and 11 tones positioned around tone index 256, and wherein logically dividing the plurality of useable tones may include logically dividing the plurality of useable tones into 4 resource units, each resource unit having 242 tones, and allocating 7 tones in the plurality of tones that are not in any resource unit into a left center block and 7 tones in the plurality of tones that are not in any resource unit into a right center block.

In some aspects, the total bandwidth may be 80 MHz, the plurality of guard tones may include 14 tones, the plurality of direct current tones may include 14 direct current tones and 14 tones positioned around tone index −256 or around tone index 256, and wherein logically dividing the plurality of useable tones may include logically dividing the plurality of useable tones into 4 resource units, each resource unit having 242 tones, and allocating 14 tones in the plurality of tones that are not in any resource unit into a left center block or into a right center block. In some aspects, the total bandwidth may be 80 MHz, the plurality of guard tones may include 17 or 15 tones, the plurality of direct current tones may include 11 or 13 direct current tones, and wherein logically dividing the plurality of useable tones may include logically dividing the plurality of useable tones into 2 resource units, each resource unit having 484 tones, and allocating 28 tones in the plurality of tones that are not in any resource unit into a center block. In some aspects, the total bandwidth may be 80 MHz, the plurality of guard tones may include 19 or 17 tones, the plurality of direct current tones may include 11 or 13 direct current tones, and wherein logically dividing the plurality of useable tones may include logically dividing the plurality of useable tones into 2 resource units, each resource unit having 484 tones, and allocating 26 tones in the plurality of tones that are not in any resource unit into a center block.

One aspect of the present disclosure provides an apparatus for wireless communication, including a processing system configured to determine a total bandwidth for a transmission of a message according to a first specification, the total bandwidth comprising a plurality of tones. A portion of the total bandwidth is occupied by a transmission according to a second specification different from the first specification. The processing system is further configured to logically divide the plurality of tones into a plurality of useable tones and into a plurality of guard tones and a plurality of direct current tones, to form a tone plan that preserves at least one physical boundary according to the second specification, logically divide the plurality of useable tones into a plurality of resource units, and determine an indication, the indication assigning and channel bonding at least two of the plurality of resource units to a wireless communication device of a plurality of wireless communication devices. The indication does not assign the portion of the total bandwidth that is occupied by the transmission according to the second specification. The apparatus also includes a transmitter configured to transmit the indication to the plurality of wireless communication devices.

In various embodiments, the first specification can include an Institute of Electrical and Electronics Engineers (IEEE) 802.11ax specification and the second specification can include a different IEEE 802.11 specification. In various embodiments, the processing system can be configured to logically divide the plurality of tones by assigning sufficient guard tones to preserve physical 20 MHz and/or 40 MHz boundaries. In various embodiments, the processing system can be configured to logically divide the plurality of tones by assigning 11 direct current or guard tones at 20 MHz and/or 40 MHz boundaries. In various embodiments, the processing system can be configured to logically divide the plurality of useable tones comprises by assigning resource units that preserve physical 20 MHz and/or 40 MHz boundaries.

In one aspect, the present disclosure provides an apparatus for wireless communication, including means for determining a total bandwidth for a transmission of a message according to a first specification, the total bandwidth comprising a plurality of tones. A portion of the total bandwidth is occupied by a transmission according to a second specification different from the first specification. The apparatus further includes means for logically dividing the plurality of tones into a plurality of useable tones and into a plurality of guard tones and a plurality of direct current tones, to form a tone plan that preserves at least one physical boundary according to the second specification. The apparatus also includes means for logically dividing the plurality of useable tones into a plurality of resource units, means for determining an indication, the indication assigning and channel bonding at least two of the plurality of resource units to a wireless communication device of a plurality of wireless communication devices. The indication does not assign the portion of the total bandwidth that is occupied by the transmission according to the second specification. The apparatus further includes means for transmitting the indication to the plurality of wireless communication devices.

In various embodiments, the first specification can include an Institute of Electrical and Electronics Engineers (IEEE) 802.11ax specification and the second specification can include a different IEEE 802.11 specification. In various embodiments, means for logically dividing the plurality of tones can include means for assigning sufficient guard tones to preserve physical 20 MHz and/or 40 MHz boundaries. In various embodiments, means for logically dividing the plurality of tones can include means for assigning 11 direct current or guard tones at 20 MHz and/or 40 MHz boundaries. In various embodiments, means for logically dividing the plurality of useable tones can include means for assigning resource units that preserve physical 20 MHz and/or 40 MHz boundaries.

One aspect of the present disclosure provides a non-transitory computer-readable medium comprising code that, when executed, causes an apparatus to determine a total bandwidth for a transmission of a message according to a first specification, the total bandwidth comprising a plurality of tones. A portion of the total bandwidth is occupied by a transmission according to a second specification different from the first specification. The medium further includes code that, when executed, causes the apparatus to logically divide the plurality of tones into a plurality of useable tones and into a plurality of guard tones and a plurality of direct current tones, to form a tone plan that preserves at least one physical boundary according to the second specification, logically divide the plurality of useable tones into a plurality of resource units, determine an indication, the indication assigning and channel bonding at least two of the plurality of resource units to a wireless communication device of a plurality of wireless communication devices. The indication does not assign the portion of the total bandwidth that is occupied by the transmission according to the second specification. e medium further includes code that, when executed, causes the apparatus to transmit the indication to the plurality of wireless communication devices.

In various embodiments, the first specification can include an Institute of Electrical and Electronics Engineers (IEEE) 802.11ax specification and the second specification can include a different IEEE 802.11 specification. In various embodiments, logically dividing the plurality of tones can include assigning sufficient guard tones to preserve physical 20 MHz and/or 40 MHz boundaries. In various embodiments, logically dividing the plurality of tones can include assigning 11 direct current or guard tones at 20 MHz and/or 40 MHz boundaries. In various embodiments, logically dividing the plurality of useable tones can include assigning resource units that preserve physical 20 MHz and/or 40 MHz boundaries.

BRIEF DESCRIPTION OF THE DRAWINGS

FIG. 3 is an illustration of the location of the left center block and the right center block within an 80 MHz transmission.

FIG. 4 is an illustration of a proposed allocation for a 20 MHz transmission.

FIG. 5 is an illustration of another proposed allocation for a 20 MHz transmission.

FIG. 6 is an illustration of another proposed allocation for a 20 MHz transmission.

FIG. 11 is an illustration of a proposed allocation for a 40 MHz transmission.

FIG. 12 is an illustration of a proposed allocation for an 80 MHz transmission.

FIG. 18 is an illustration of a proposed allocation for an 80 MHz transmission.

FIG. 19 is an illustration of another proposed allocation for an 80 MHz transmission.

FIG. 28 is an illustration of a proposed allocation for an 80 MHz transmission.

FIG. 29 is an illustration of another proposed allocation for an 80 MHz transmission.

DETAILED DESCRIPTION

Figure 1:
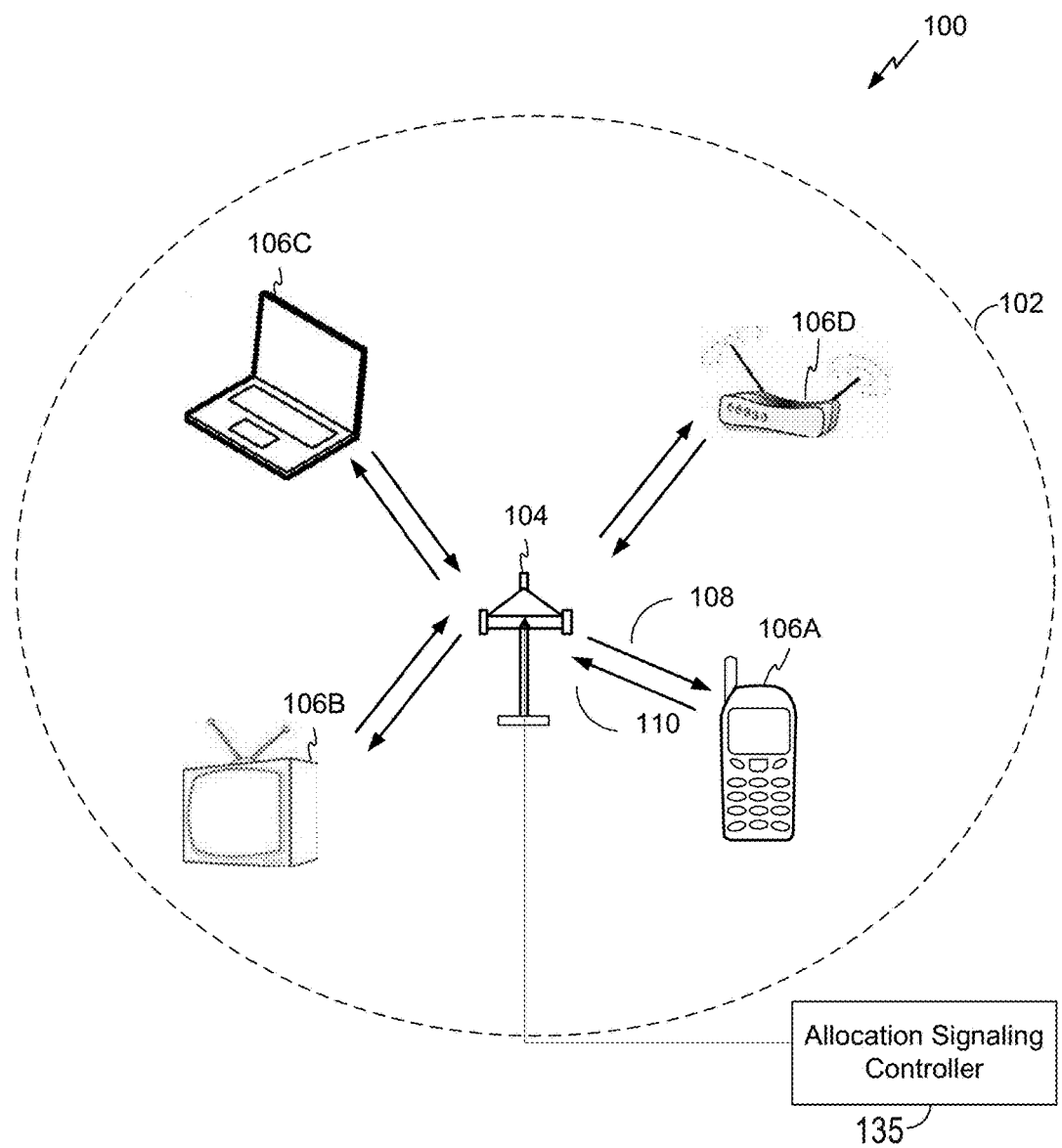
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (such as an IEEE 802.11 protocol) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example an IEEE 802.11 standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with code division multiple access (CDMA) techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106. In some aspects of the present disclosure, the AP 104 may also have an allocation signaling controller 135. As explained in more detail below, such a controller may be configured to allocate a bandwidth into a number of minimum allocations, to identify one or more devices that may be assigned allocations in a transmission (either uplink or downlink), and to transmit information to those one or more devices, signaling their allocation to those devices.

Figure 2:
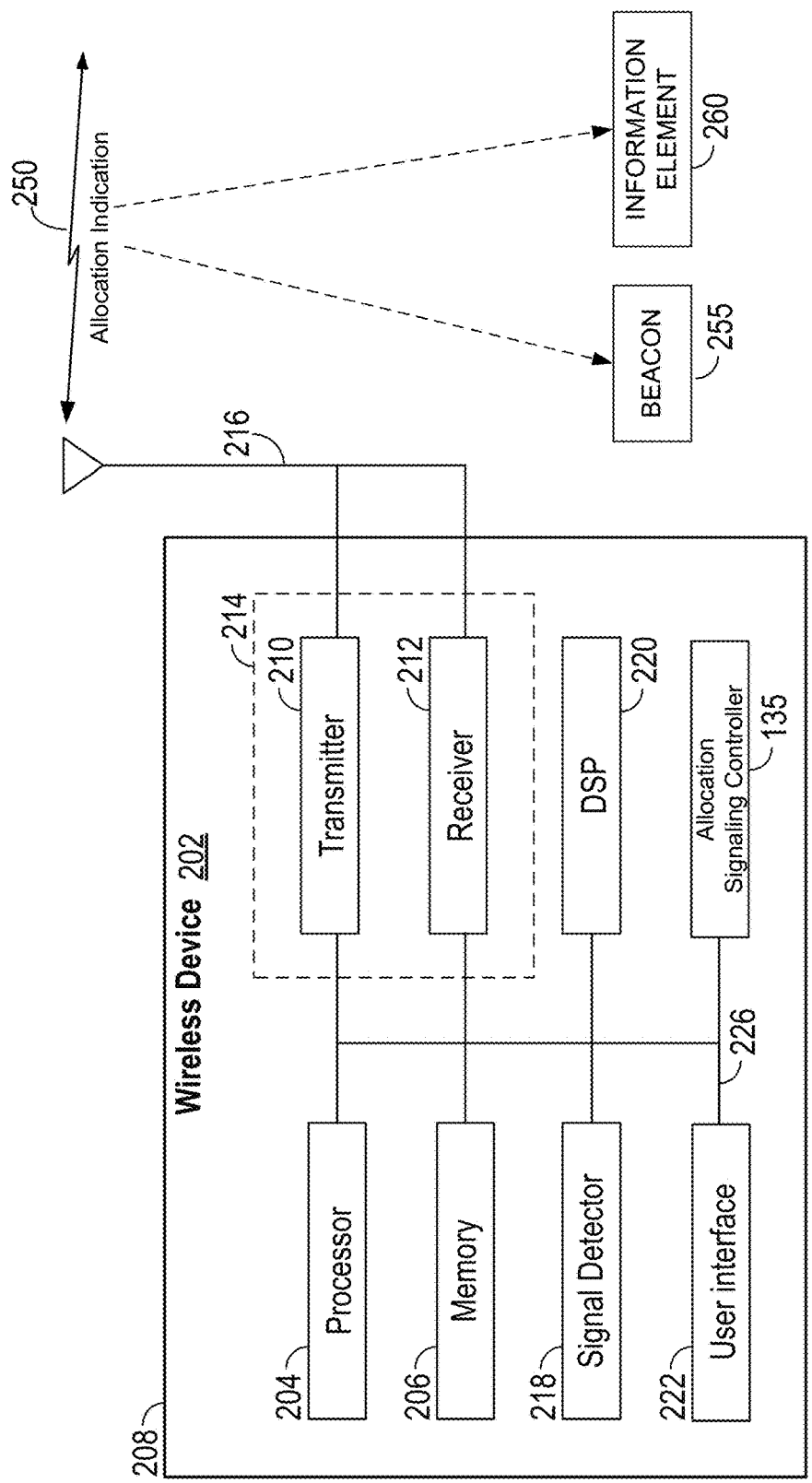
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during multiple-in multiple-out (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer convergence protocol (PLCP) packet data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol, and stations using older or legacy 802.11 protocols (such as 802.11ac), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience. In some aspects of the present disclosure, the AP 104 may also have an allocation signaling controller 135. As explained in more detail below, such a controller may be configured to allocate a bandwidth into a number of minimum allocations, to identify one or more devices that may be assigned allocations in a transmission (either uplink or downlink), and to transmit information to those one or more devices, signaling their allocation to those devices. Thus, when the wireless device 202 is configured as the AP 104, the AP 104 can transmit an allocation indication 250 to the STAs 106A-106D. When the wireless device 202 is configured as a STA 106A, the STA 106A can receive the allocation indication 250 from the AP 104. In various embodiments, the allocation indication 250 can be provided in, a beacon or information element (IE).

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 ms and a 4× symbol duration can be 12.8 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Resource Allocation

A number of different methods have been discussed for allocating resources in a OFDMA transmission. For example, certain proposals have related to using multiple building block sizes, as compared to using a single building block size for any given bandwidth. For example, an OFDMA transmission may include a number of tones. Some of these tones may be used as DC tones and guard tones. Other tones may be allocated to a particular device, and that device may use those tones as pilot tones and data tones. Generally, tone plans have considered the sizes of the blocks of tones allocated to a given device, as "building blocks." A given device may be allocated one or more such blocks. It may be desired to design a tone plan which maximizes throughput of the network, minimizes network overhead (such as overhead used to signal tone allocations to devices which may be transmitting or receiving data in an OFDMA transmission). Other considerations may also be considered. For example, it may be desirable, in a 40 MHz or 80 MHz transmission, to keep certain boundaries clear. For example, it may be desirable to keep a boundary between each 40 MHz or 20 MHz portion of a transmission clear, such as by including a number of guard tones between two portions of the transmission.

Certain proposals have also increased the packing efficiency of the proposal by filling small holes (that is, tones that would not otherwise fit into a building block). For example, these holes may be filled by using blocks with a small resource granularity (13 or 14 tones) in those holes. Other proposals have some extra allocations on all the leftover tones collected from sub-band DC tones and guards, such that the tones are non-contiguous. In some aspects, certain proposals have also brought up new constraints in resource allocations, and have preserved 20 and 40 MHz boundaries in certain allocations. Accordingly, when considering tone plans, it should be determined how important it is to align a tone place with 20 and 40 MHz boundaries, and whether small holes need to be filled for better efficiency.

In some aspects, it may be beneficial to use a tone plan that has building block sizes that are the same size as existing tone plans. For example, IEEE 802.11ac and/or 802.11ah may provide for tone plans, such as interleaving parameters and numbers of pilot tones, for tone allocations including 26, 56, 114, 242, and 484 tones. Accordingly, when tone allocations of these sizes are used, it may be beneficial as existing tone plans may be used rather than needing new designs. In some aspects, one new resource granularity may be used (such as blocks of 13 or 14 tones) in order to allow for better packing efficiencies by making use of tones that might otherwise be unused or leftover. Certain aspects may also include single carrier transmission on entire bandwidth with no 20 MHz boundaries preserved and where each allocation block (large or small) has contiguous tones. Alternatively, the majority allocations may align with 20 MHz boundaries, and small allocations may be inserted on the tones of inter-20 MHz and sub-DCs to help packing efficiency, which may have non-contiguous tones.

Another method may include using only two building block sizes for any particular bandwidth, with a basic tone unit (BTU) and a small tone unit (STU). The BTU size may be a function of bandwidth, and may reuse existing numerology (that is, may use tone blocks of one or more of 26, 56, 114, 242, and 484 tones, as used in IEEE 802.11ac/ah). The STU may be 7 contiguous tones regardless of bandwidth, and a minimum resource allocation may include two such resource units. This design may include many STUs inserted between BTUs, main to increase the packing efficiency. However, it may not be easy to find and pack so many small packets to fill in STUs. Here, the 20 MHz boundary may be preserved when the STU allocations are ignored. For example, if certain STUs are not assigned, the 20 MHz boundaries may be preserved.

Preservation of Physical Boundaries

In various embodiments, certain tone plans don't have physical 20/40 MHz boundaries preserved. Accordingly, certain resource units (RUs, alternatively referred to as tone groups or tone allocation units) or edge tones may be punctured or omitted to create the boundaries (for example, guard tones) if channel bonding is used. In various preferred embodiments discussed herein, allocations can leave sufficient guard tones to preserve the physical 20/40 MHz boundaries, and resource units can be adjusted accordingly.

In some aspects, preserving 20 and/or 40 MHz boundaries may have several advantages. For example, preserving this boundary may ease interference management. For example, a particular device may have interference on one or more 20 MHz portion of a bandwidth. By preserving 20 MHz boundaries within, for example, an 80 MHz transmission, this may make it easier to pre-allocate devices to clean 20 or 40 MHz channels, where that device may not suffer from interference. Further, preserving these boundaries may also accommodate channel bonding. In some embodiments, channel bonding can be performed where a portion of the entire bandwidth (BW) is occupied by a legacy or 802.11ax transmission, and the rest of the contiguous or non-contiguous frequency bands can still be scheduled together. For example, in some aspect, a network may be in proximity of legacy devices, such as IEEE 802.11ac devices. These devices may transmit on, for example, one 20 MHz channel where that channel is within an 80 MHz bandwidth of the OFDMA transmission. Accordingly, OFDMA transmissions may be configured to transmit 20 MHz and 40 MHz, with a 20 MHz "hole" in the bandwidth, in order to allow legacy devices to transmit using that bandwidth and to prevent interference from or with those devices. When boundaries between the different 20 MHz portions of the transmission are maintained, allowing for such a "hole" in the transmission may require only minimal signaling and changes to tone plans. Accordingly, it may be beneficial to preserve 20 and/or 40 MHz boundaries in an OFDMA transmission.

Accordingly, the present disclosure proposes clear 20 and 40 MHz boundaries, and tone plans which allow for efficient resource allocation. These tone plans may preserve these boundaries when needed, according to different use cases. These tone plans may also fill the small holes for better efficiency by introducing a center block (CB), left center block (LCB) and/or right center block (RCB). Note that the designation of "left" may be related to the way in which tones of a transmission are often illustrated, with negative indices on the left and positive indices on the right. Accordingly, the CB may be at a center of a transmission (around the DC tones). In an 80 MHz transmission, the LCB may be on the "left" (negative indices) of a transmission, in the center of the left 40 MHz of the 80 MHz bandwidth, at indices around −256. Similarly, the RCB may be on the "right" (positive indices) of a transmission, in the center of the right 40 MHz of the 80 MHz bandwidth, at indices around 256.

When designing a tone plan, certain design methodology may be used for a given bandwidth. First, we may reserve the tones for the 20/40 MHz boundaries that need to be preserved as well as the DC tones. For example, we may assume 11 tones for each boundary, as that is the number required in the IEEE 802.11ac standard. Generally, the 20 MHz boundary (around index −256) on the left 40 MHz of an 80 MHz transmission may also be thought of as the DC tones for the left 40 MHz, and may be referred to as DC1. Similarly, the 20 MHz boundary (around index 256) on the right 40 MHz of an 80 MHz transmission may be referred to as DC2. The number of DC tones used may be 7 or 11, where 7 are needed as DC tones, but 11 tones may be needed in order to preserve boundaries between 20 or 40 MHz portions of a transmission. For example, in an 80 MHz transmission, the sub-band combination of 20+40+20 MHz for clear boundaries has same DC for both 80 MHz and central 40 MHz. Note that for 40 MHz DC, the existing tone plan for 512 fast Fourier transform (FFT) has 11 DC tones. Further, the number of DC tones can be 11 if they also serve 20/40 MHz boundary. For example, in an 80 MHz transmission, the sub-band combination of 20+20+20+20, 40+40, 20+20+40 out of 80 MHz BSS may be used.

In some aspects, the allocation may use standard blocks (SB) as the building blocks of all allocations, except the center block (CB) or left and right center blocks (LCB, RCB) and SBs may reuse existing numerology (out of 26, 56, 114, 242, 484 tones) as resource granularities. Standard blocks can have single size for a given bandwidth or can have multiple sizes for each bandwidth. In some aspects, each useable tone (that is, tones which may be used for data or pilot tones, rather than tones used as DC or guard tones) may be assigned to one of a SB, a CB, a RCB, or a LCB.

For 20+20 out of 40 MHz and 40+40 out of 80 MHz, the Center Block (CB) may be defined and may have a fixed location at the center of the packet bandwidth. The size of the CB may depend upon the number of leftover tones after the SBs. Generally, there may also be slight adjustments on the number of DC tones and guard tones in order to allow the CB to contain a number of tones which fit into combination of allocations with known tone plans. For example, if a SB has single building block size regardless of bandwidth of the transmission, then the CB may have a block size which scales with the bandwidth of the transmission. Generally, the CB may contain an equal number of tones on each side of the DC tones (or one additional tone on one side, when an odd-numbered CB size is used).

For 80 MHz transmissions which wish to have boundaries for 20+20+20+20 MHz, 20+40+20 MHz, and/or 20+20+40 MHz, Left Center Block (LCB) and Right Center Block (RCB) are defined and have fixed locations around DC tones for the left 40 MHz (DC1, around index −256) and for right 40 MHz (DC2, around index 256), respectively, with block size depending on the number of leftover tones. In some aspects, the number of DC tones and guard tones may be slightly adjusted in order to allow LCB and/or RCB to have allocations of tones that align with known tone plans. If, on the left or right 40 MHz DCs, the tones were already reserved for 20 MHz boundary, then the left or right center block should be allocated around those boundary tones. Generally, the LCB and RCB may contain an equal number of tones on each side of a DC1 or a DC2, respectively (or one additional tone on one side, when an odd-numbered LCB/RCB size is used). In some aspects, the LCB or RCB may also be provided when a DC1 or DC2 is not used. In this case, the LCB or RCB may be at the central tones on either the left 40 MHz or the right 40 MHz of an 80 MHz transmission. For example, in these cases, the LCB may be centered around tone index −256, and the RCB may be centered around tone index 256.

Note that in some aspects, it may be beneficial to opportunistically use otherwise unused tones. For example, it may be the case that 11 guard tones and 7 DC tones with tone indices [−128:−123,−3:3, 123:127] in 20 MHz, [−256:−251,−3:3, 251:255] in 40 MHz, and [−512:−507,−3:3, 507:511] in 80 MHz are needed. Other tones may also be reserved in the following allocations, including additional guard tones, additional DC tones, which may be adjacent to CB, DC1 tones, which may be adjacent to LCB, and DC2 tones, which may be adjacent to RCB. If no physical 20/40 MHz sub-band boundaries need to be preserved, DC1 and DC2 may be used as populated tones (data+pilot), and possibly be merged with CB/LCB/RCB adjacent to them. Alternatively, if physical 20/40 MHz sub-band boundaries need to be preserved, transmit nothing in these tones so they may be used as boundaries. In some aspects, DC1/DC2+LCB/RCB may be used as extended blocks to replace the center block or edge blocks. For example, these blocks could be on (for transmission) and off (for no transmission) according to the need of preserving 20/40 MHz boundaries. This may be beneficial in that it may not require a separate tone plan for cases in which the boundaries do not need to be preserved.

FIG. 3 is an illustration of the location of the left center block 315 and the right center block 325 within an 80 MHz transmission. The 80 MHz transmission may include 1024 tones, which may each have an index number from −512 (at the top of the figure) to +511 (at the bottom of the figure). As illustrated, the left guard tones 335 may occur in the lowest indices of a transmission (starting from index −512 and often including six or more consecutive tones), followed by tones which are used for standard blocks (SBs) 305. DC1 355 may include a number of tones which are between (at the mid-point of, such as around tone index −256) the two 20 MHz halves of the left 40 MHz, and on both sides of DC1 355, there may be tones to form a left center block (LCB) 315. The LCB 315 may include tones on both sides of DC1 355, and may include an equal number of tones on each side of DC1 355. Accordingly, LCB 315 may be centered on tone index −256. The right center block (RCB) 325 may be placed similarly surrounding DC2 375 (around tone index 256), in the right 40 MHz of an 80 MHz transmission. A number of tones, such as 11 tones, may also be used at DC tones 365 in a transmission. These tones may be centered around tone index 0 in a transmission. Finally, the last (highest indices) five or more tones may be used as right guard tones 345. These tones, like the left guard tones 335, may not contain any information in a transmission, and may be used to provide a guard between the OFDMA transmission and other transmissions which may occur on other bandwidths. This design, and others presented herein, may allow for clear 20 and 40 MHz boundaries whenever needed. This design may also ensure packing efficiency by having CB, LCB, and/or RCB, which can be used for control channel in a DL OFDMA message, or the first/last user in an UL or DL OFDMA message, depending upon the signaling used (such as in a trigger message, or in a header of an OFDMA message, or elsewhere). In some aspects, this design may ensure that no signaling is needed for the CB, or the LCB, or the RCB, and thereby reduce signaling overhead.

FIG. 4 is an illustration of a proposed allocation for a 20 MHz transmission. A 20 MHz transmission may include 256 tones, and each tone may have an index number from −128 (at the top of the figure) to +127 (at the bottom of the figure). Of these tones, 11 may be used as guard tones (including left guard tones 435 and right guard tones 445), and 11 may be used as DC 425 tones. This may allow for a SB 405 size of 26 tones to be used, with each SB 405 including 2 pilot tones and 24 data tones. Accordingly, this allocation may use an existing tone plan, as a 26 tone plan, with 24 data tones and 2 pilot tones, may be incorporated into the IEEE 802.11ac and 802.11ah standards. This allocation may have 8 SBs 405, and may have a CB 415 with 26 tones around the DC 425 tones, with half of these tones on one side of the DC 425 tones, and half on the other side of the DC 425 tones. Various resource allocations may be possible using this tone plan. For example, one user may be allocated all 242 tones (an existing tone plan in IEEE 802.11ac with 256 tones, with 3 DC 425 tones and 11 guard tones), two users may share the tones with one user allocated the CB 415 and the other user allocated the 8 SBs 405. Various other combinations may be possible so that any number of users may use the SBs 405 and the CB 415 in this allocation. In some aspects, since the CB 415 is the same size as the SB 405, the CB 415 may be thought of as another SB 405, which would amount to 9 SBs 405.

FIG. 5 is an illustration of another proposed allocation for a 20 MHz transmission. A 20 MHz transmission may include 256 tones, and each tone may have an index number from −128 (at the top of the figure) to +127 (at the bottom of the figure). Of these tones, 11 may be used as guard tones (including left guard tones 535 and right guard tones 545), and 7 may be used as DC 525 tones. This may allow for a SB 505 size of 56 tones to be used, and the transmission may include 4 SBs 505. Generally, transmitting 56 tones may use an existing tone plan, which is included as part of the IEEE 802.11ac and/or IEEE 802.11ah standard. This allocation may have a CB 515 with 14 tones, with half of those tones on each side of the DC 525 tones. These blocks may be allocated between one, two, three, or more users in various combinations, in order to allocate the tones to the different numbers of devices and in different amounts. For example, one user may be allocated all 242 tones (an existing tone plan in 11ac with 256 tones, minus 3 DC tones and 11 guard tones). Note that the CB 515 in this allocation includes 14 tones, which may require a new tone plan. For example, the CB 515 may include 2 pilot tones and 12 data tones.

FIG. 6 is an illustration of another proposed allocation for a 20 MHz transmission. A 20 MHz transmission may include 256 tones, and each tone may have an index number from −128 (at the top of the figure) to +127 (at the bottom of the figure). Of these tones, 11 or 9 may be used as guard tones (including left guard tones 635 and right guard tones 645), and 3 or 5 may be used as DC 625 tones. For example, 11 guard tones and 3 DC 625 tones may be used, or 9 guard tones and 5 DC 625 tones may be used. This may allow for a SB 605 size of 114 tones to be used, and the transmission may include 2 SBs 605. Generally, transmitting 114 tones may use an existing tone plan, which is included as part of the IEEE 802.11ac and/or IEEE 802.11ah standard. This allocation may have a CB 615 with 14 tones, with half of those tones on each side of the DC 625 tones. These blocks may be allocated between one, two, three, or more users in various combinations, in order to allocate the tones to the different numbers of devices and in different amounts. For example, one user may be allocated all 242 tones (an existing tone plan in 11ac with 256 tones, with 3 DC tones and 11 guard tones). Note that the CB 615 in this allocation includes 14 tones, which may require a new tone plan. For example, the CB 615 may include 2 pilot tones and 12 data tones.

Figure 7:
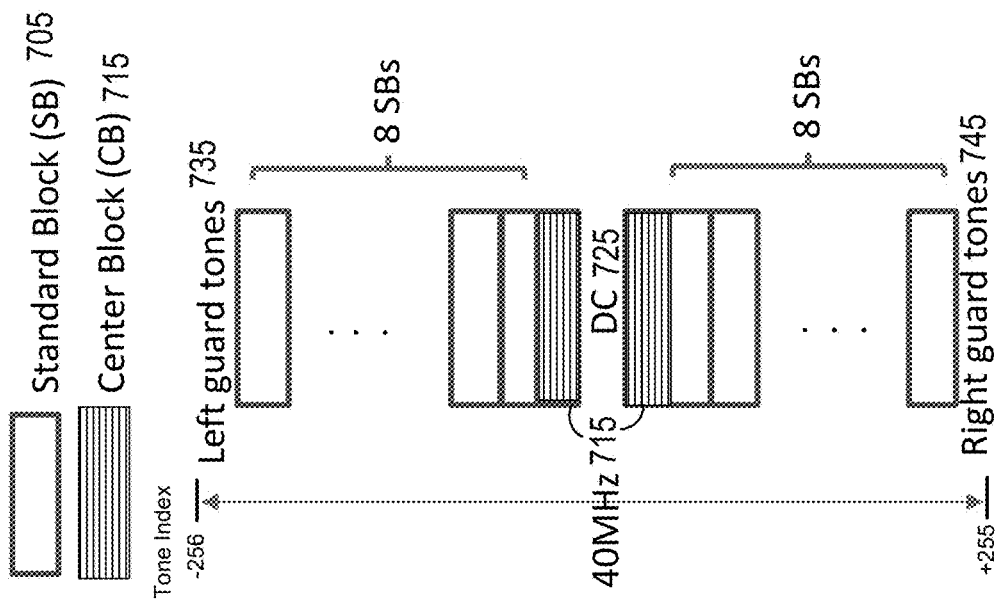
FIG. 7 is an illustration of a proposed allocation for a 40 MHz transmission.

FIG. 7 is an illustration of a proposed allocation for a 40 MHz transmission. A 40 MHz transmission may include 512 tones, and each tone may have an index number from −256 (at the top of the figure) to +255 (at the bottom of the figure). Of these tones, 15 may be used as guard tones (including left guard tones 735 and right guard tones 745), and 11 may be used as DC tones 725. This may allow for a SB size of 26 tones to be used, and the transmission may include 16 SBs 705. Generally, transmitting 26 tones may use an existing tone plan, which is included as part of the IEEE 802.11ac and/or IEEE 802.11ah standard. This allocation may have a CB 715 with 70 tones, with half of those tones on each side of the DC 725 tones. These blocks may be allocated between one, two, three, or more users in various combinations, in order to allocate the tones to the different numbers of devices and in different amounts. For example, one device may be allocated all blocks, and may use existing 484 tone numerology (where there are 11 guard tones instead of 15), as found in the IEEE 802.11ac and/or IEEE 802.11ah standards. Note that the CB 725 in this allocation includes 70 tones, which may be allocated in a number of different ways. For example, they may be allocated as a 56 tone allocation (with 4 pilot tones and 52 data tones) and a 14 tone allocation (with 2 pilot tones and 12 data tones). Alternatively, a 70 tone CB 715 may be used as five 14 tone allocations (each with 2 pilot tones and 12 data tones).

Figure 8:
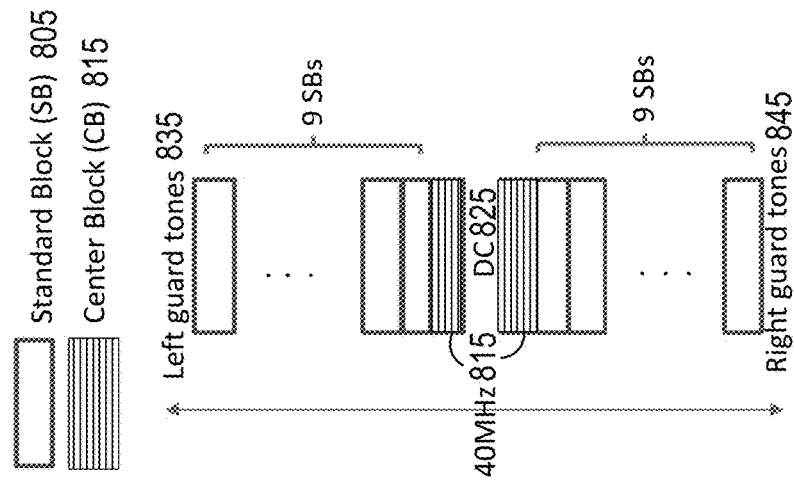
FIG. 8 is an illustration of a proposed allocation for a 40 MHz transmission.

FIG. 8 is an illustration of a proposed allocation for a 40 MHz transmission. A 40 MHz transmission may include 512 tones, and each tone may have an index number from −256 (at the top of the figure) to +255 (at the bottom of the figure). Of these tones, 19 or 17 or 15 may be used as guard tones (including left guard tones 835 and right guard tones 845), and 11 or 13 or 15, respectively, may be used as DC tones 825. This may allow for a SB size of 26 tones to be used, and the transmission may include 18 SBs 805. Generally, transmitting 26 tones may use an existing tone plan, which is included as part of the IEEE 802.11ac and/or IEEE 802.11ah standard. This allocation may have a CB 815 with 14 tones, with half of those tones on each side of the DC tones 825. These blocks may be allocated between one, two, three, or more users in various combinations, in order to allocate the tones to the different numbers of devices and in different amounts. For example, one device may be allocated all blocks, and may use new 512FFT numerology (such as a new tone plan, including a number of pilot tones and data tones, as well as interleaver parameters) or existing 484 tone numerology (where there are 11 guard tones and 11 DC tones), as found in the IEEE 802.11ac and/or IEEE 802.11ah standards. Note that the CB 815 in this allocation includes 14 tones, which may require a new tone plan. For example, the CB 815 may include 2 pilot tones and 12 data tones.

Figures 9, 10:
FIG. 9 is an illustration of a proposed allocation for a 40 MHz transmission.
FIG. 10 is an illustration of a proposed allocation for a 40 MHz transmission.

FIG. 9 is an illustration of a proposed allocation for a 40 MHz transmission. A 40 MHz transmission may include 512 tones, and each tone may have an index number from −256 (at the top of the figure) to +255 (at the bottom of the figure). Of these tones, 11 may be used as guard tones (including left guard tones 935 and right guard tones 945), and 11 may be used as DC tones 925. This may allow for a SB size of 56 tones to be used, and the transmission may include 8 SBs 905. Generally, transmitting 56 tones may use an existing tone plan, which is included as part of the IEEE 802.11ac and/or IEEE 802.11ah standard. This allocation may have a CB 915 with 42 tones, with half of those tones on each side of the DC tones 925. These blocks may be allocated between one, two, three, or more users in various combinations, in order to allocate the tones to the different numbers of devices and in different amounts. For example, one device may be allocated all blocks, and may use existing 484 tone numerology, as found in the IEEE 802.11ac and/or IEEE 802.11ah standards. Note that the CB 915 in this allocation includes 42 tones, which may be allocated into three blocks of 14 tones each. Each of these blocks may include 2 pilot tones and 12 data tones.

FIG. 10 is an illustration of a proposed allocation for a 40 MHz transmission. A 40 MHz transmission may include 512 tones, and each tone may have an index number from −256 (at the top of the figure) to +255 (at the bottom of the figure). Of these tones, 17 may be used as guard tones (including left guard tones 1035 and right guard tones 1045), and 11 may be used as DC tones 1025. This may allow for a SB size of 114 tones to be used, and the transmission may include 4 SBs 1005. Generally, transmitting 114 tones may use an existing tone plan, which is included as part of the IEEE 802.11ac and/or IEEE 802.11ah standard. This allocation may have a CB 1015 with 28 tones, with half of those tones on each side of the DC tones 1025. These blocks may be allocated between one, two, three, or more users in various combinations, in order to allocate the tones to the different numbers of devices and in different amounts. For example, one device may be allocated all blocks, and may use existing 484 tone numerology (where there are 11 guard tones instead of 17), as found in the IEEE 802.11ac and/or IEEE 802.11ah standards. Note that the CB 1015 in this allocation includes 28 tones, which may be allocated into two blocks of 14 tones each. Each of these blocks may include 2 pilot tones and 12 data tones.

FIG. 11 is an illustration of a proposed allocation for a 40 MHz transmission. A 40 MHz transmission may include 512 tones, and each tone may have an index number from −256 (at the top of the figure) to +255 (at the bottom of the figure). Of these tones, 17 may be used as guard tones (including left guard tones 1135 and right guard tones 1145), and 11 may be used as DC tones 1125. This may allow for a SB size of 242 tones to be used, and the transmission may include 2 SBs 1105. Generally, transmitting 242 tones may use an existing tone plan, which is included as part of the IEEE 802.11ac and/or IEEE 802.11ah standard. This allocation may have no CB 1115. These blocks may be allocated between one or two devices. For example, one device may be allocated both blocks, and may use existing 484 tone numerology (where there are 11 guard tones instead of 17), as found in the IEEE 802.11ac and/or IEEE 802.11ah standards.

FIG. 12 is an illustration of a proposed allocation for an 80 MHz transmission. This allocation may be used to preserve a boundary for 40+40 MHz, that is, the boundary between the first 40 MHz and the second 40 MHz. An 80 MHz transmission may include 1024 tones, and each tone may have an index number from −512 (at the top of the figure) to +511 (at the bottom of the figure). Of these tones, 11 may be used as guard tones (including left guard tones 1235 and right guard tones 1245), and 11 may be used as DC tones 1225. This may allow for a SB size of 26 tones to be used, and the transmission may include 32 SBs 1205. Generally, transmitting 26 tones may use an existing tone plan, which is included as part of the IEEE 802.11ac and/or IEEE 802.11ah standard. This allocation may have a CB 1215 with 170 tones, with half of those tones on each side of the DC tones 1225. These blocks (CB 1215 and SBs 1205) may be allocated between one, two, three, or more users in various combinations, in order to allocate the tones to the different numbers of devices and in different amounts. For example, each SB 1205 and the CB 1215 may be allocated to a single user, using a new 1024FFT numerology. Note that the CB 1215 in this allocation includes 170 tones, which may be allocated into one block of 114 tones, and one block of 56 tones, both of wish may user existing numerology. For example, the block with 114 tones may include 6 pilot tones and 108 data tones, and the block with 56 tones may include 52 data tones and 4 pilot tones. Alternatively, the CB 1215 of 170 tones, which may be allocated into one block of 114 tones, and four blocks of 14 tones. Each of the 14-tone blocks may include 2 pilot tones and 12 data tones.

Figures 13, 14:
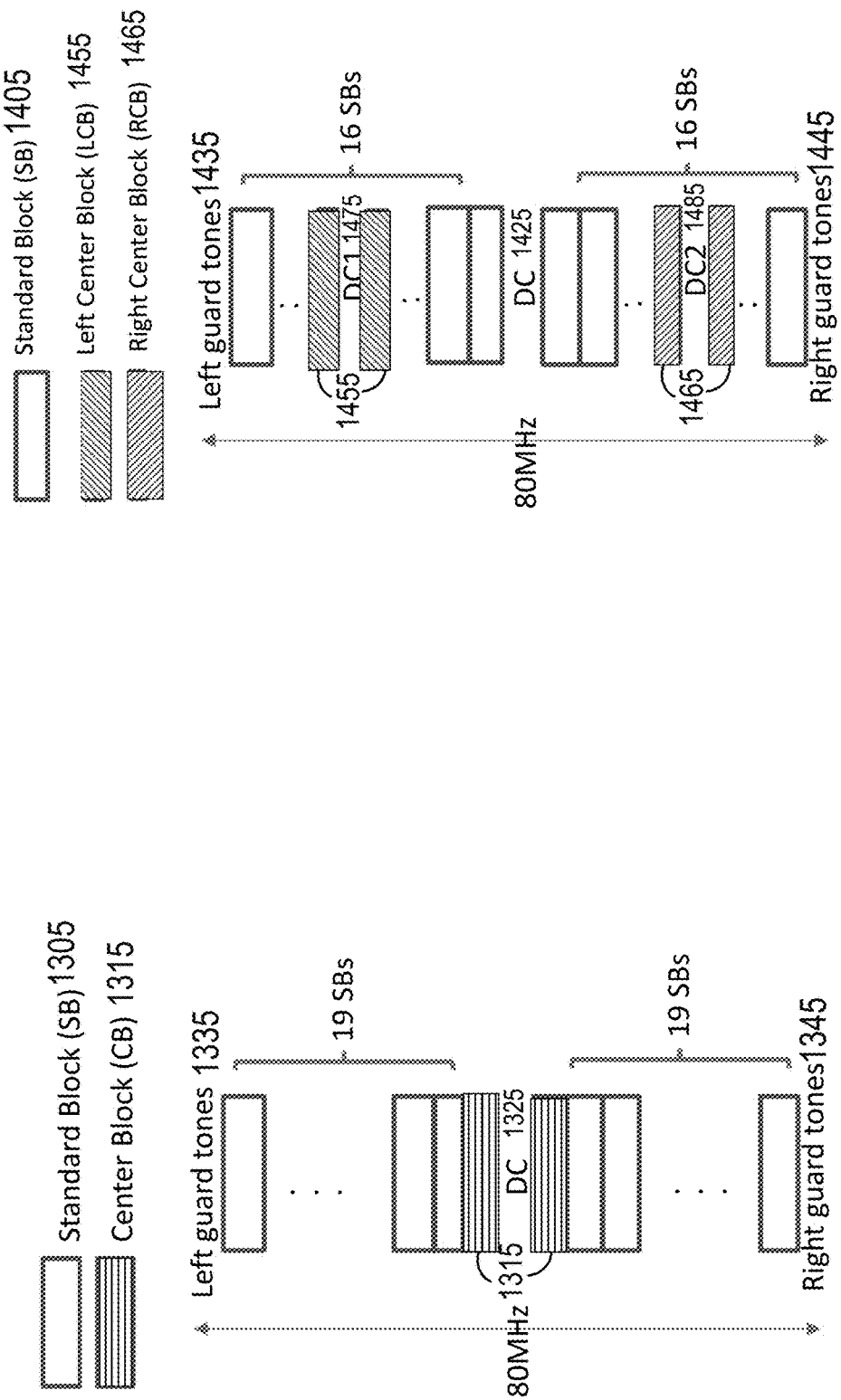
FIG. 13 is an illustration of another proposed allocation for an 80 MHz transmission.
FIG. 14 is an illustration of a proposed allocation for an 80 MHz transmission.

FIG. 13 is an illustration of a proposed allocation for an 80 MHz transmission. This allocation may be used to preserve a boundary for 40+40 MHz, that is, the boundary between the first 40 MHz and the second 40 MHz. An 80 MHz transmission may include 1024 tones, and each tone may have an index number from −512 (at the top of the figure) to +511 (at the bottom of the figure). Of these tones, 11 may be used as guard tones (including left guard tones 1335 and right guard tones 1345), and 11 may be used as DC tones 1325. This may allow for a SB size of 26 tones to be used, and the transmission may include 38 SBs 1305. Generally, transmitting 26 tones may use an existing tone plan, which is included as part of the IEEE 802.11ac and/or IEEE 802.11ah standard. This allocation may have a CB 1315 with 14 tones, with half of those tones on each side of the DC tones 1325. These blocks (CB 1315 and SBs 1305) may be allocated between one, two, three, or more users in various combinations, in order to allocate the tones to the different numbers of devices and in different amounts. For example, each SB 1305 and the CB 1315 may be allocated to a single user, using new 1024FFT numerology. Note that the CB 1315 in this allocation includes 14 tones, which may include 12 data tones and 2 pilot tones in one allocation.

FIG. 14 is an illustration of a proposed allocation for an 80 MHz transmission. This allocation may be used to preserve a boundary for 20+20+20+20 MHz or for 20+40+20 MHz, that is, the boundary at DC 1425, DC1 1475, and DC2 1485 or at DC1 1475 and DC2 1485, respectively. An 80 MHz transmission may include 1024 tones, and each tone may have an index number from −512 (at the top of the figure) to +511 (at the bottom of the figure). Of these tones, 15 or 14 may be used as guard tones (including left guard tones 1435 and right guard tones 1445), and 15 or 14 may be used as DC tones 1405. DC1 1475 may include 11 tones, and DC2 1485 may also include 11 tones. This may allow for a SB size of 26 tones to be used, and the transmission may include 32 SBs 1405. Generally, transmitting 26 tones may use an existing tone plan, which is included as part of the IEEE 802.11ac and/or IEEE 802.11ah standard. This allocation may have an LCB 1455 with 70 or 71 tones, with half of those tones on each side of the DC1 1475 tones. This allocation may also have an RCB 1465 with 70 or 71 tones, with half of those tones on each side of the DC2 1485 tones. Note that LCB 1455+RCB 1465 with 140 tones may fit two 56 tone allocations plus two 14 tone allocations. Alternatively, LCB+RCB with 140 tones may fit into ten 14 tone allocations. Note that LCB+RCB with 142 tones may fit one 114 tone allocation plus two 14 tone allocations. Each 70 tone LCB 1455 or RCB 1465 fits one 56 tone allocation and one 14 tone allocation. Alternatively, each 70 tone LCB 1455 or RCB 1465 fits five 14 tone allocations. These blocks (RCB 1465, LCB 1455 and SBs 1405) may be allocated between one, two, three, or more users in various combinations, in order to allocate the tones to the different numbers of devices and in different amounts. For example, each SB 1405 and the LCB+RCB may be allocated to a single user, using new 1024FFT numerology.

FIG. 14 also illustrates another proposed allocation for an 80 MHz transmission. This allocation may be used to preserve a boundary for 20+20+20+20 MHz or for 20+40+20 MHz, that is, the boundary at DC 1425, DC1 1475, and DC2 1485 or at DC1 1475 and DC2 1485, respectively. An 80 MHz transmission may include 1024 tones, and each tone may have an index number from −512 (at the top of the figure) to +511 (at the bottom of the figure). Of these tones, 11 may be used as guard tones (including left guard tones 1435 and right guard tones 1445), and 11 may be used as DC tones 1425. DC1 1475 may include 15 or 14 tones, and DC2 1485 may also include 15 or 14 tones. This may allow for a SB size of 26 tones to be used, and the transmission may include 32 SBs 1405. Generally, transmitting 26 tones may use an existing tone plan, which is included as part of the IEEE 802.11ac and/or IEEE 802.11ah standard. This allocation may have an LCB 1455 with 70 or 71 tones, with half of those tones on each side of the DC1 tones 1475. This allocation may also have an RCB 1465 with 70 or 71 tones, with half of those tones on each side of the DC2 tones 1485. Note that LCB+RCB with 140 tones may fit two 56 tone allocations plus two 14 tone allocations. Alternatively, LCB+RCB with 140 tones may fit into ten 14 tone allocations. Note that LCB+RCB with 142 tones may fit one 114 tone allocation plus two 14 tone allocations. Each 70 tone LCB 1455 or RCB 1465 fits one 56 tone allocation and one 14 tone allocation. Alternatively, each 70 tone LCB 1455 or RCB 1465 fits five 14 tone allocations. These blocks (RCB 1465, LCB 1455 and SBs 1405) may be allocated between one, two, three, or more users in various combinations, in order to allocate the tones to the different numbers of devices and in different amounts. For example, each SB 1405 and the LCB+RCB may be allocated to a single user, using new 1024FFT numerology.

Figure 15:
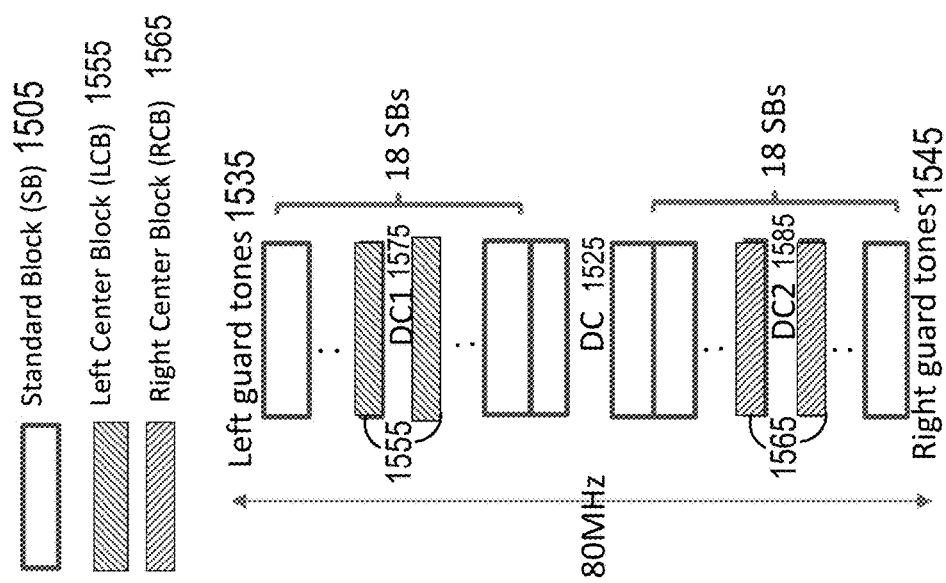
FIG. 15 is an illustration of another proposed allocation for an 80 MHz transmission.

FIG. 15 is an illustration of a proposed allocation for an 80 MHz transmission. This allocation may be used to preserve a boundary for 20+20+20+20 MHz or for 20+40+20 MHz, that is, the boundary at DC 1525, DC1 1575, and DC2 1585 or at DC1 1575 and DC2 1585, respectively. An 80 MHz transmission may include 1024 tones, and each tone may have an index number from −512 (at the top of the figure) to +511 (at the bottom of the figure). Of these tones, 13 may be used as guard tones (including left guard tones 1535 and right guard tones 1545), and 11 may be used as DC tones 1525. DC1 1575 may include 11 tones, and DC2 1585 may also include 11 tones. This may allow for a SB size of 26 tones to be used, and the transmission may include 36 SBs 1505. Generally, transmitting 26 tones may use an existing tone plan, which is included as part of the IEEE 802.11ac and/or IEEE 802.11ah standard. This allocation may have an LCB 1555 with 21 tones, with half of those tones on each side of the DC1 tones 1575. This allocation may also have an RCB 1565 with 21 tones, with half of those tones on each side of the DC2 tones 1585. Note that LCB+RCB with 42 tones may fit three 14 tone allocations. These blocks (RCB 1565, LCB 1555 and SBs 1505) may be allocated between one, two, three, or more users in various combinations, in order to allocate the tones to the different numbers of devices and in different amounts. For example, each SB 1505 and the LCB+RCB may be allocated to a single user, using new 1024FFT numerology.

In another aspect, FIG. 15 may also illustrate another proposed allocation for an 80 MHz transmission. This allocation may be used to preserve a boundary for 20+20+20+20 MHz or for 20+40+20 MHz, that is, the boundary at DC 1525, DC1 1575, and DC2 1585 or at DC1 1575 and DC2 1585, respectively. An 80 MHz transmission may include 1024 tones, and each tone may have an index number from −512 (at the top of the figure) to +511 (at the bottom of the figure). Of these tones, 15 or 13 may be used as guard tones (including left guard tones 1535 and right guard tones 1545), and 11 or 13 may be used as DC tones 1525. DC1 1575 may include 11 tones, and DC2 1585 may also include 11 tones. This may allow for a SB size of 26 tones to be used, and the transmission may include 36 SBs 1505. Generally, transmitting 26 tones may use an existing tone plan, which is included as part of the IEEE 802.11ac and/or IEEE 802.11ah standard. This allocation may have an LCB 1555 with 20 tones, with half of those tones on each side of the DC1 tones 1575. This allocation may also have an RCB 1565 with 20 tones, with half of those tones on each side of the DC2 tones 1585. Note that LCB+RCB with 40 tones may fit one 14 tone allocation and one 26 tone allocation. These blocks (RCB 1565, LCB 1555 and SBs 1505) may be allocated between one, two, three, or more users in various combinations, in order to allocate the tones to the different numbers of devices and in different amounts. For example, each SB 1505 and the LCB+RCB may be allocated to a single user, using new 1024FFT numerology.

In another aspect, FIG. 15 may also illustrate yet another proposed allocation for an 80 MHz transmission. This allocation may be used to preserve a boundary for 20+20+20+20 MHz or for 20+40+20 MHz, that is, the boundary at DC 1525, DC1 1575, and DC2 1585 or at DC1 1575 and DC2 1585, respectively. An 80 MHz transmission may include 1024 tones, and each tone may have an index number from −512 (at the top of the figure) to +511 (at the bottom of the figure). Of these tones, 15 may be used as guard tones (including left guard tones 1535 and right guard tones 1545), and 15 may be used as DC tones 1525. DC1 1575 may include 15 tones, and DC2 1585 may also include 15 tones. This may allow for a SB size of 26 tones to be used, and the transmission may include 36 SBs 1505. Generally, transmitting 26 tones may use an existing tone plan, which is included as part of the IEEE 802.11ac and/or IEEE 802.11ah standard. This allocation may have an LCB 1555 with 14 tones, with half of those tones on each side of the DC1 tones 1575. This allocation may also have an RCB 1565 with 14 tones, with half of those tones on each side of the DC2 tones 1585. Note that each of LCB 1555 and RCB 1565 may fit one 14 tone allocation. These blocks (RCB 1565, LCB 1555 and SBs 1505) may be allocated between one, two, three, or more users in various combinations, in order to allocate the tones to the different numbers of devices and in different amounts. For example, each SB 1505 and the LCB+RCB may be allocated to a single user, using new 1024FFT numerology.

Figures 16, 17:
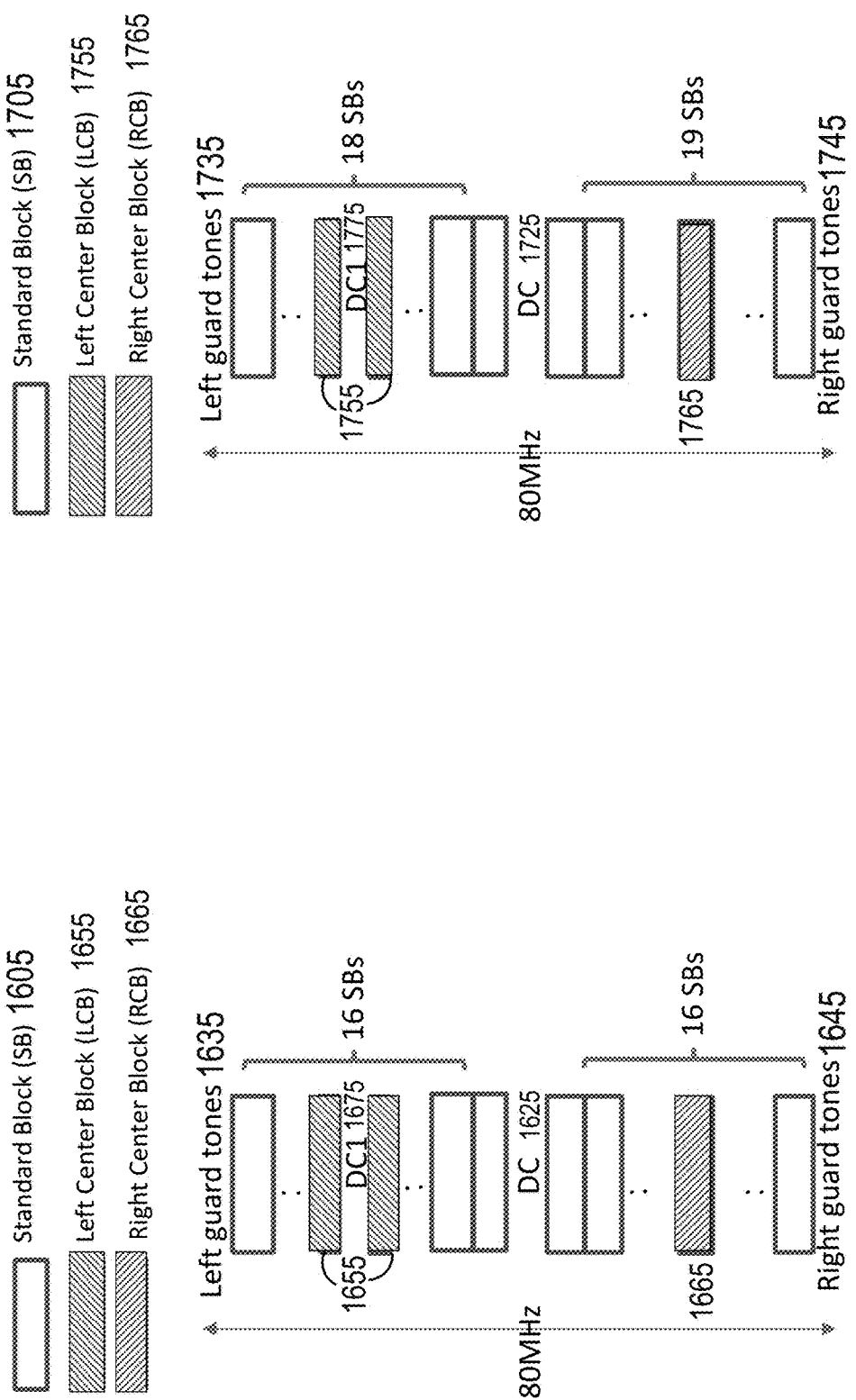
FIG. 16 is an illustration of a proposed allocation for an 80 MHz transmission.
FIG. 17 is an illustration of another proposed allocation for an 80 MHz transmission.

FIG. 16 illustrates a proposed allocation for an 80 MHz transmission. This allocation may be used to preserve a boundary for 20+20+40 MHz, that is, the boundary at DC 1625 and DC1 1675. An 80 MHz transmission may include 1024 tones, and each tone may have an index number from −512 (at the top of the figure) to +511 (at the bottom of the figure). Of these tones, 15 may be used as guard tones (including left guard tones 1635 and right guard tones 1645), and 14 may be used as DC tones 1625 (that is, tones from index −7 to 6, or from −6 to 7). DC1 1675 may include 11 tones. In some aspects, this allocation may also be used to preserve the boundary at DC2, when DC1 1675 may not be used, and DC2 may contain 11 tones. This may allow for a SB size of 26 tones to be used, and the transmission may include 32 SBs 1605. Generally, transmitting 26 tones may use an existing tone plan, which is included as part of the IEEE 802.11ac and/or IEEE 802.11ah standard. This allocation may have an LCB 1655 with 70 tones, with half of those tones on each side of the DC1 tones 1675. This allocation may also have an RCB 1665 with 82 tones, when no DC2 is used. (The number of tones for LCB 1655 and RCB 1665 may be reversed, when preserving DC2 rather than DC1 1675). Note that LCB 1655 may fit one 14 tone allocation and one 56 tone allocation, or alternatively, five 14 tone allocations, while RCB 1665 may fit one 26 tone allocation and one 56 tone allocation, or alternatively, one 26 tone allocation and four 14 tone allocations. These blocks (RCB 1665, LCB 1655 and SBs 1605) may be allocated between one, two, three, or more users in various combinations, in order to allocate the tones to the different numbers of devices and in different amounts. For example, each SB 1605 and the LCB+RCB may be allocated to a single user, using new 1024FFT numerology.

FIG. 17 illustrates a proposed allocation for an 80 MHz transmission. This allocation may be used to preserve a boundary for 20+20+40 MHz, that is, the boundary at DC 1725 and DC1 1775 (or at DC 1725 and DC2, as the number of tones for LCB 1755 and DC1 1775 may be reversed with those for RCB 1765 and DC2). An 80 MHz transmission may include 1024 tones, and each tone may have an index number from −512 (at the top of the figure) to +511 (at the bottom of the figure). Of these tones, 12 may be used as guard tones, and 11 may be used as DC tones 1725. DC1 1775 may include 11 tones. In some aspects, this allocation may also be used to preserve the boundary at DC2, when DC1 1775 may not be used, and DC2 may contain 11 tones. This may allow for a SB size of 26 tones to be used, and the transmission may include 37 SBs 1705. Generally, transmitting 26 tones may use an existing tone plan, which is included as part of the IEEE 802.11ac and/or IEEE 802.11ah standard. This allocation may have an LCB 1755 with 21 tones, with half of those tones on each side of the DC1 tones 1775. This allocation may also have an RCB 1765 with 7 tones, when no DC2 is used. (The number of tones for LCB 1755 and RCB 1765 may be reversed, when preserving DC2 rather than DC1 1775). Note that LCB+RCB may fit two 14 tone allocations. These blocks (RCB 1765, LCB 1755 and SBs 1705) may be allocated between one, two, three, or more users in various combinations, in order to allocate the tones to the different numbers of devices and in different amounts. For example, each SB 1705 and the LCB+RCB may be allocated to a single user, using new 1024FFT numerology.

FIG. 17 also illustrates another proposed allocation for an 80 MHz transmission. This allocation may be used to preserve a boundary for 20+20+40 MHz, that is, the boundary at DC 1725 and DC1 1775 (or at DC 1725 and DC2, as the number of tones for LCB 1755 and DC1 1775 may be reversed with those for RCB 1765 and DC2). An 80 MHz transmission may include 1024 tones, and each tone may have an index number from −512 (at the top of the figure) to +511 (at the bottom of the figure). Of these tones, 12 may be used as guard tones (including left guard tones 1735 and right guard tones 1745), and 12 may be used as DC tones 1725 (either [−6:5] or [−5:6]). DC1 1775 may include 12 tones. In some aspects, this allocation may also be used to preserve the boundary at DC2, when DC1 1775 may not be used, and DC2 may contain 12 tones. This may allow for a SB size of 26 tones to be used, and the transmission may include 37 SBs 1705. Generally, transmitting 26 tones may use an existing tone plan, which is included as part of the IEEE 802.11ac and/or IEEE 802.11ah standard. This allocation may have an LCB 1755 with 20 tones, with half of those tones on each side of the DC1 tones 1775. This allocation may also have an RCB 1765 with 6 tones, when no DC2 is used. (The number of tones for LCB 1755 and RCB 1765 may be reversed, when preserving DC2 rather than DC1 1775). Note that LCB+RCB may fit one 26 tone allocation. These blocks (RCB, LCB and SBs) may be allocated between one, two, three, or more users in various combinations, in order to allocate the tones to the different numbers of devices and in different amounts. For example, each SB 1705 and the LCB+RCB may be allocated to a single user, using new 1024FFT numerology.

FIG. 18 illustrates another proposed allocation for an 80 MHz transmission. This allocation may be used to preserve a boundary for 20+20+40 MHz, that is, the boundary at DC 1825 and DC1 1875 (or at DC 1825 and DC2, as the number of tones for LCB 1855 and DC1 1875 may be reversed with those for RCB 1865 and DC2). An 80 MHz transmission may include 1024 tones, and each tone may have an index number from −512 (at the top of the figure) to +511 (at the bottom of the figure). Of these tones, 12 may be used as guard tones (including left guard tones 1835 and right guard tones 1845), and 12 may be used as DC tones 1825 (either [−6:5] or [−5:6]). DC1 1875 may include 12 tones. In some aspects, this allocation may also be used to preserve the boundary at DC2, when DC1 1875 may not be used, and DC2 may contain 12 tones. This may allow for a SB size of 26 tones to be used, and the transmission may include 36 SBs 1805. Generally, transmitting 26 tones may use an existing tone plan, which is included as part of the IEEE 802.11ac and/or IEEE 802.11ah standard. This allocation may have an LCB 1855 with 20 tones, with half of those tones on each side of the DC1 tones 1875. This allocation may also have an RCB 1865 with 32 tones, when no DC2 is used. (The number of tones for LCB 1855 and RCB 1865 may be reversed, when preserving DC2 rather than DC1 1875). Note that LCB+RCB may fit two 26 tone allocations. These blocks (RCB 1865, LCB 1855 and SBs 1805) may be allocated between one, two, three, or more users in various combinations, in order to allocate the tones to the different numbers of devices and in different amounts. For example, each SB 1805 and the LCB+RCB may be allocated to a single user, using new 1024FFT numerology. Note that one 26 tone allocation may be contained completely within RCB, and thus, does not cross the 20+20+40 MHz boundaries. This may also be considered another SB, in which case, the RCB may not be at the center of the right 40 MHz.

The other 26 tone allocation from the LCB+RCB is assigned across the 20+20+40 MHz boundaries, and thus, may not be considered a SB.

FIG. 19 illustrates another proposed allocation for an 80 MHz transmission. This allocation may be used to preserve a boundary for 40+40 MHz, that is, the boundary at the DC tones 1925. An 80 MHz transmission may include 1024 tones, and each tone may have an index number from −512 (at the top of the figure) to +511 (at the bottom of the figure). Of these tones, 13 or 11 may be used as guard tones (including left guard tones 1935 and right guard tones 1945), and 11 or 13 may be used as DC tones 1925. This may allow for a SB size of 56 tones to be used, and the transmission may include 16 SBs 1905. Generally, transmitting 56 tones may use an existing tone plan, which is included as part of the IEEE 802.11ac and/or IEEE 802.11ah standard. This allocation may have a CB 1915 with 104 tones, with half of those tones on each side of the DC tones 1925. Note that CB 1915 may fit four 26 tone allocations. These blocks (CB 1915 and SBs 1905) may be allocated between one, two, three, or more users in various combinations, in order to allocate the tones to the different numbers of devices and in different amounts. For example, each SB 1905 and the CB 1925 may be allocated to a single user, using new 1024FFT numerology.

FIG. 19 also illustrates another proposed allocation for an 80 MHz transmission. This allocation may be used to preserve a boundary for 40+40 MHz, that is, the boundary at the DC tones 1925. An 80 MHz transmission may include 1024 tones, and each tone may have an index number from −512 (at the top of the figure) to +511 (at the bottom of the figure). Of these tones, 15 may be used as guard tones (including left guard tones 1935 and right guard tones 1945), and 15 may be used as DC tones 1925. This may allow for a SB size of 56 tones to be used, and the transmission may include 16 SBs 1905. Generally, transmitting 56 tones may use an existing tone plan, which is included as part of the IEEE 802.11ac and/or IEEE 802.11ah standard. This allocation may have a CB 1915 with 98 tones, with half of those tones on each side of the DC tones 1925. Note that CB 1915 may fit seven 14 tone allocations. Alternatively, CB 1915 may fit one 56 tone allocation and three 14 tone allocations. While the 56 tone allocation in the CB 1915 has the same size as the SBs, it includes tones on both sides of the DC tones 1925, and would be across the 40+40 MHz boundary. Therefore, it may not be considered an SB 1905. These blocks (CB 1915 and SBs 1905) may be allocated between one, two, three, or more users in various combinations, in order to allocate the tones to the different numbers of devices and in different amounts. For example, each SB 1905 and the CB 1915 may be allocated to a single user, using new 1024FFT numerology.

Figures 20, 21:
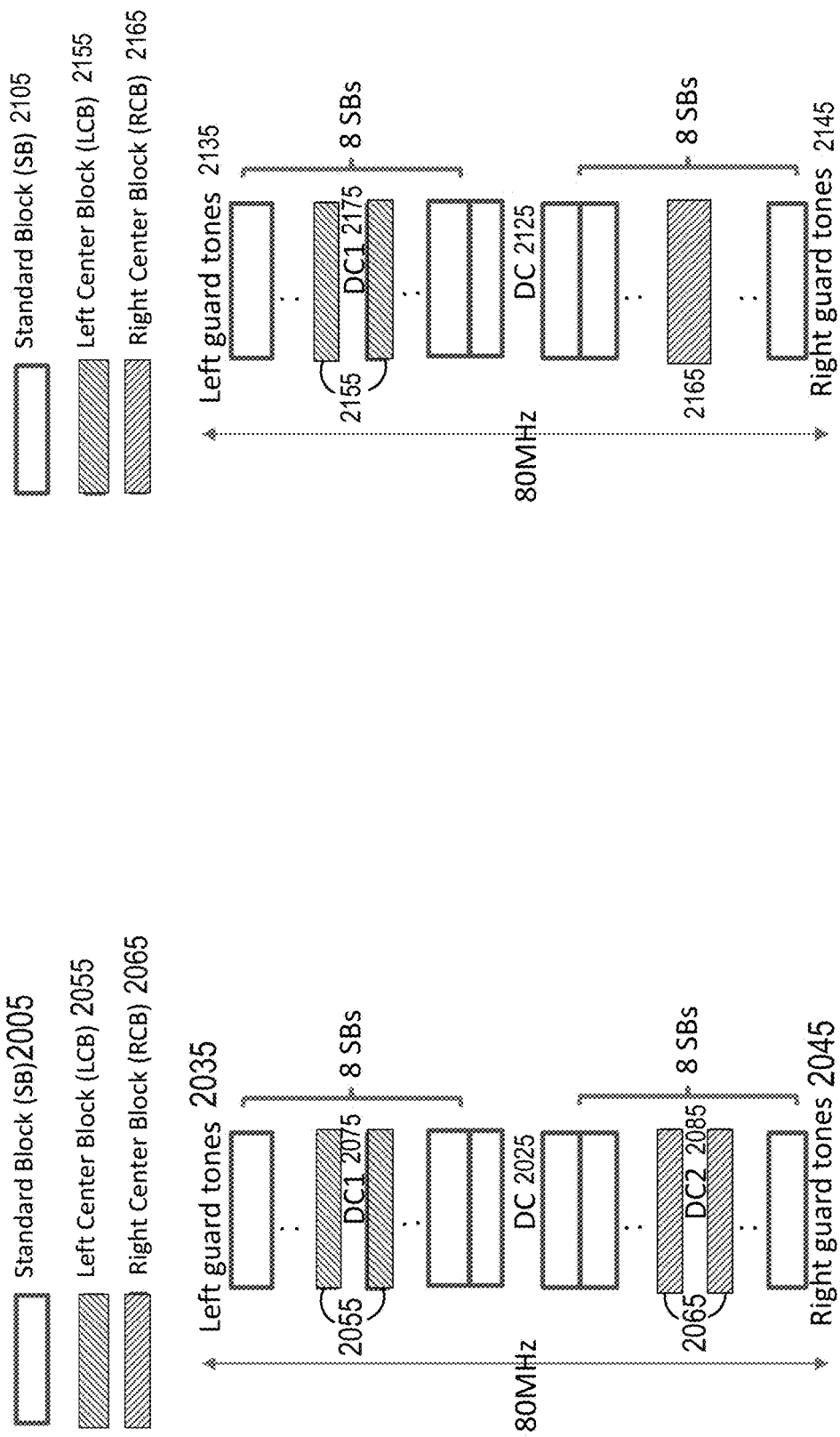
FIG. 20 is an illustration of a proposed allocation for an 80 MHz transmission.
FIG. 21 is an illustration of another proposed allocation for an 80 MHz transmission.

FIG. 20 illustrates another proposed allocation for an 80 MHz transmission. This allocation may be used to preserve a boundary for 20+20+20+20 or 20+40+20 MHz, that is, the boundary at the DC 2025, DC1 2075 and DC2 2085 tones or at the DC1 2075 and DC2 2085 tones, respectively. An 80 MHz transmission may include 1024 tones, and each tone may have an index number from −512 (at the top of the figure) to +511 (at the bottom of the figure). Of these tones, 11 may be used as guard tones (including left guard tones 2035 and right guard tones 2045), and 11 may be used as DC tones 2025. Further, there may also be 11 DC1 tones 2075 and 11 DC2 2085 tones. This may allow for a SB size of 56 tones to be used, and the transmission may include 16 SBs 2005. Generally, transmitting 56 tones may use an existing tone plan, which is included as part of the IEEE 802.11ac and/or IEEE 802.11ah standard. This allocation may have an LCB 2055 with 42 tones, with half of those tones on each side of the DC1 2075 tones, and an RCB 2065 with 42 tones, with half of those tones on each side of the DC2 2085 tones. Note that LCB 2055 or RCB 2065 may each fit three 14 tone allocations. Alternatively, the LCB+RCB may fit one 56 tone allocation and two 14 tone allocations. While the 56 tone allocation in the LCB+RCB has the same size as the SBs 2005, it includes tones on both sides of the DC tones 2025, and would be across the 20+20+20+20 or 20+40+20 MHz boundaries. Therefore, it may not be considered an SB. These blocks (LCB 2055, RCB 2065 and SBs 2005) may be allocated between one, two, three, or more users in various combinations, in order to allocate the tones to the different numbers of devices and in different amounts. For example, each SB 2005 and the LCB+RCB may be allocated to a single user, using new 1024FFT numerology.

FIG. 20 also illustrates another proposed allocation for an 80 MHz transmission. This allocation may be used to preserve a boundary for 20+20+20+20 or 20+40+20 MHz, that is, the boundary at the DC 2025, DC1 2075 and DC2 2085 tones or at the DC1 2075 and DC2 2085 tones, respectively. An 80 MHz transmission may include 1024 tones, and each tone may have an index number from −512 (at the top of the figure) to +511 (at the bottom of the figure). Of these tones, 13 or 11 may be used as guard tones (including left guard tones 2035 and right guard tones 2045), and 11 or 13 may be used as DC tones 2025. Further, there may also be 11 DC1 tones 2075 and 11 DC2 tones 2085. This may allow for a SB size of 56 tones to be used, and the transmission may include 16 SBs 2005. Generally, transmitting 56 tones may use an existing tone plan, which is included as part of the IEEE 802.11ac and/or IEEE 802.11ah standard. This allocation may have an LCB 2055 with 41 tones, with half of those tones on each side of the DC1 tones 2075, and an RCB 2065 with 41 tones, with half of those tones on each side of the DC2 tones 2085. Note that LCB+RCB may fit one 56 tone allocation and one 26 tone allocation. While the 56 tone allocation in the LCB+RCB has the same size as the SBs 2005, it includes tones on both sides of the DC tones, and would be across the 20+20+20+20 or 20+40+20 MHz boundaries. Therefore, it may not be considered an SB 2005. These blocks (LCB 2055, RCB 2065 and SBs 2005) may be allocated between one, two, three, or more users in various combinations, in order to allocate the tones to the different numbers of devices and in different amounts. For example, each SB 2005 and the LCB+RCB may be allocated to a single user, using new 1024FFT numerology.

FIG. 21 illustrates another proposed allocation for an 80 MHz transmission. This allocation may be used to preserve a boundary for 20+20+40 MHz, that is, the boundary at the DC 2125 and DC1 2175 tones (or at DC 2125 and DC2, by switching the number of tones for DC1/DC2 and for LCB/RCB). An 80 MHz transmission may include 1024 tones, and each tone may have an index number from −512 (at the top of the figure) to +511 (at the bottom of the figure). Of these tones, 12 may be used as guard tones (including left guard tones 2135 and right guard tones 2145), and 11 may be used as DC tones 2125. Further, there may also be 11 DC1 tones 2175. This may allow for a SB size of 56 tones to be used, and the transmission may include 16 SBs 2105. Generally, transmitting 56 tones may use an existing tone plan, which is included as part of the IEEE 802.11ac and/or IEEE 802.11ah standard. This allocation may have an LCB 2155 with 42 tones, with half of those tones on each side of the DC1 tones 2175, and an RCB 2165 with 52 tones. Note that LCB 2155 may fit three 14 tone allocations, and RCB 2165 may fit two 26 tone allocations. These blocks (LCB 2155, RCB 2165 and SBs 2105) may be allocated between one, two, three, or more users in various combinations, in order to allocate the tones to the different numbers of devices and in different amounts. For example, each SB 2105 and the LCB+RCB may be allocated to a single user, using new 1024FFT numerology.

FIG. 21 also illustrates another proposed allocation for an 80 MHz transmission. This allocation may be used to preserve a boundary for 20+20+40 MHz, that is, the boundary at the DC 2125 and DC1 2175 tones (or at DC 2105 and DC2, by switching the number of tones for DC1/DC2 and for LCB/RCB). An 80 MHz transmission may include 1024 tones, and each tone may have an index number from −512 (at the top of the figure) to +511 (at the bottom of the figure). Of these tones, 13 may be used as guard tones (including left guard tones 2135 and right guard tones 2145), and 12 may be used as DC tones 2125 (from [−6:5] or [−5:6]). Further, there may also be 11 DC1 tones 2175. This may allow for a SB size of 56 tones to be used, and the transmission may include 16 SBs 2105. Generally, transmitting 56 tones may use an existing tone plan, which is included as part of the IEEE 802.11ac and/or IEEE 802.11ah standard. This allocation may have an LCB 2155 with 41 or 42 tones, with half of those tones on each side of the DC1 tones 2175, and an RCB 2155 with 51 or 50 tones. Note that LCB+RCB may fit three 26 tone allocations and one 14 tone allocation. These blocks (LCB 2155, RCB 2165 and SBs 2105) may be allocated between one, two, three, or more users in various combinations, in order to allocate the tones to the different numbers of devices and in different amounts. For example, each SB 2105 and the LCB+RCB may be allocated to a single user, using new 1024FFT numerology.

Figures 22, 23:
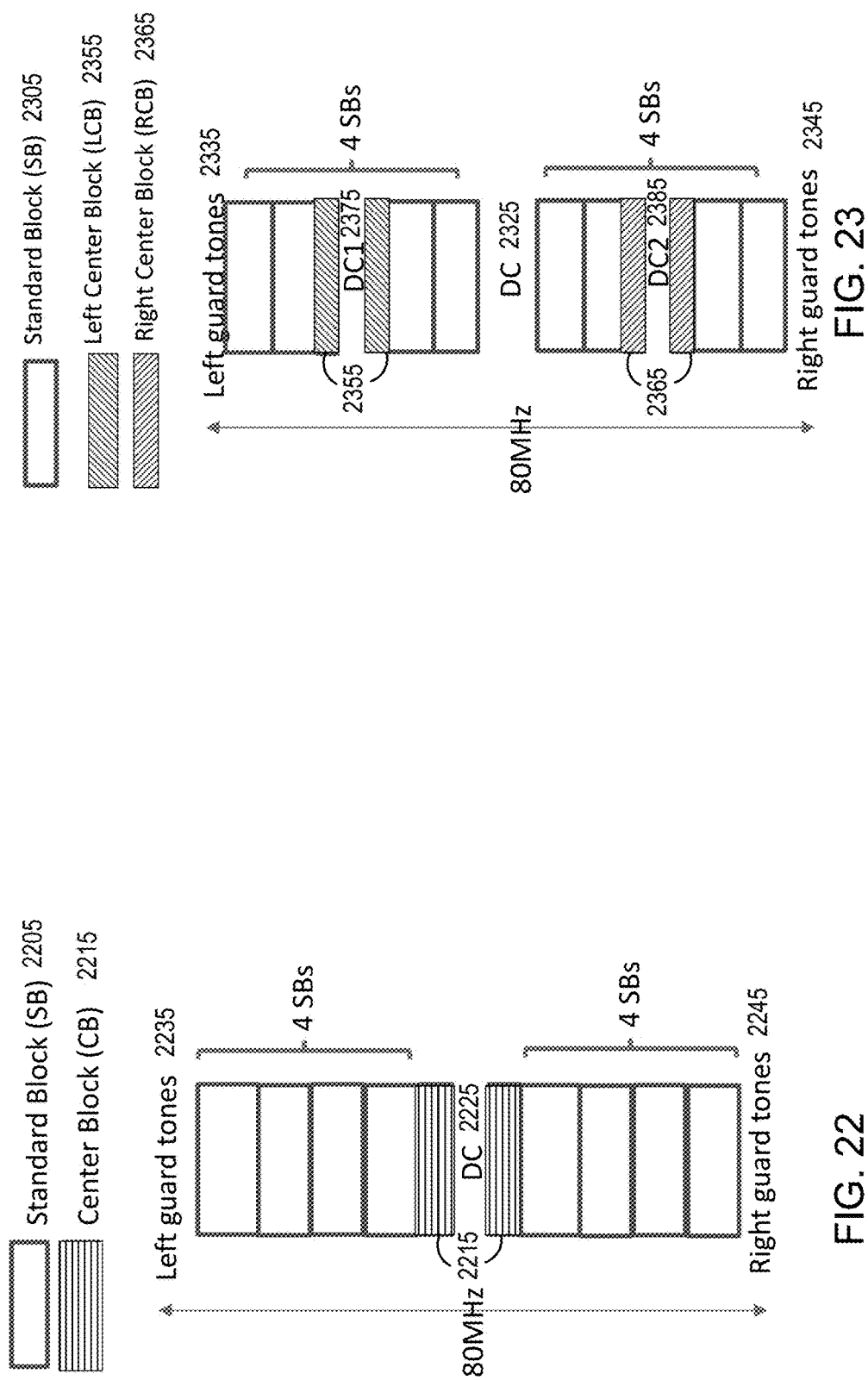
FIG. 22 is an illustration of a proposed allocation for an 80 MHz transmission.
FIG. 23 is an illustration of another proposed allocation for an 80 MHz transmission.

FIG. 22 illustrates another proposed allocation for an 80 MHz transmission. This allocation may be used to preserve a boundary for 40+40 MHz, that is, the boundary at the DC tones 2225. An 80 MHz transmission may include 1024 tones, and each tone may have an index number from −512 (at the top of the figure) to +511 (at the bottom of the figure). Of these tones, 14 may be used as guard tones (including left guard tones 2235 and right guard tones 2245), and 14 may be used as DC tones 2225 (from [−7:6] or [−6:7]). This may allow for a SB size of 114 tones to be used, and the transmission may include 8 SBs 2205. Generally, transmitting 114 tones may use an existing tone plan, which is included as part of the IEEE 802.11ac and/or IEEE 802.11ah standard. This allocation may have a CB 2215 with 84 tones, with half of those tones on each side of the DC tones 2225. Note that CB 2215 may fit one 56 tone allocation and two 14 tone allocations, or may fit six 14 tone allocations. These blocks (CB 2215 and SBs 2205) may be allocated between one, two, three, or more users in various combinations, in order to allocate the tones to the different numbers of devices and in different amounts. For example, each SB 2205 and the CB 2215 may be allocated to a single user, using new 1024FFT numerology.

FIG. 22 also illustrates another proposed allocation for an 80 MHz transmission. This allocation may be used to preserve a boundary for 40+40 MHz, that is, the boundary at the DC tones 2225. An 80 MHz transmission may include 1024 tones, and each tone may have an index number from −512 (at the top of the figure) to +511 (at the bottom of the figure). Of these tones, 15 may be used as guard tones (including left guard tones 2235 and right guard tones 2245), and 15 may be used as DC tones 2225. This may allow for a SB size of 114 tones to be used, and the transmission may include 8 SBs 2205. Generally, transmitting 114 tones may use an existing tone plan, which is included as part of the IEEE 802.11ac and/or IEEE 802.11ah standard. This allocation may have a CB 2215 with 82 tones, with half of those tones on each side of the DC tones 2225. Note that CB 2215 may fit one 56 tone allocation and one 26 tone allocation. These blocks (CB 2215 and SBs 2205) may be allocated between one, two, three, or more users in various combinations, in order to allocate the tones to the different numbers of devices and in different amounts. For example, each SB 2205 and the CB 2215 may be allocated to a single user, using new 1024FFT numerology.

FIG. 23 illustrates another proposed allocation for an 80 MHz transmission. This allocation may be used to preserve a boundary for 20+20+20+20 or 20+40+20 MHz, that is, the boundary at the DC 2325, DC1 2375, and DC2 2385 tones or the boundary at the DC1 2375 and DC2 2385 tones. An 80 MHz transmission may include 1024 tones, and each tone may have an index number from −512 (at the top of the figure) to +511 (at the bottom of the figure). Of these tones, 13 or 11 may be used as guard tones (including left guard tones 2335 and right guard tones 2345), and 11 or 13 may be used as DC tones 2325. Further, 11 tones may be used for DC1 tones 2375 and 11 tones may be used for DC2 tones 2385. This may allow for a SB size of 114 tones to be used, and the transmission may include 8 SBs 2305. Generally, transmitting 114 tones may use an existing tone plan, which is included as part of the IEEE 802.11ac and/or IEEE 802.11ah standard. This allocation may have an LCB 2355 with 33 tones, with half of those tones on each side of the DC1 tones 2375 and an RCB 2365 with 33 tones, with half of those tones on each side of the DC2 tones 2385. Note that LCB+RCB together may fit two 26 tone allocation and one 14 tone allocation. These blocks (LCB 2355, RCB 2365 and SBs 2305) may be allocated between one, two, three, or more users in various combinations, in order to allocate the tones to the different numbers of devices and in different amounts. For example, each SB 2305 and the LCB+RCB may be allocated to a single user, using new 1024FFT numerology.

FIG. 23 also illustrates another proposed allocation for an 80 MHz transmission. This allocation may be used to preserve a boundary for 20+20+20+20 or 20+40+20 MHz, that is, the boundary at the DC 2325, DC1 2375, and DC2 2385 tones or the boundary at the DC1 2375 and DC2 2385 tones. An 80 MHz transmission may include 1024 tones, and each tone may have an index number from −512 (at the top of the figure) to +511 (at the bottom of the figure). Of these tones, 14 or 17 may be used as guard tones (including left guard tones 2335 and right guard tones 2345), and 14 (e.g., [−7,6] or [−6,7]) or 13 may be used as DC tones 2325. Further, 14 or 13 tones may be used for DC1 tones 2375 and 14 or 13 tones may be used for DC2 tones 2385. This may allow for a SB size of 114 tones to be used, and the transmission may include 8 SBs 2305. Generally, transmitting 114 tones may use an existing tone plan, which is included as part of the IEEE 802.11ac and/or IEEE 802.11ah standard. This allocation may have an LCB 2355 with 28 tones, with half of those tones on each side of the DC1 tones 2375 and an RCB 2365 with 28 tones, with half of those tones on each side of the DC2 tones 2385. Note that LCB+RCB together may fit one 56 tone allocation, or each may individually fit two 14 tone allocations. These blocks (LCB 2355, RCB 2365 and SBs 2305) may be allocated between one, two, three, or more users in various combinations, in order to allocate the tones to the different numbers of devices and in different amounts. For example, each SB 2305 and the LCB+RCB may be allocated to a single user, using new 1024FFT numerology.

Figures 24, 25:
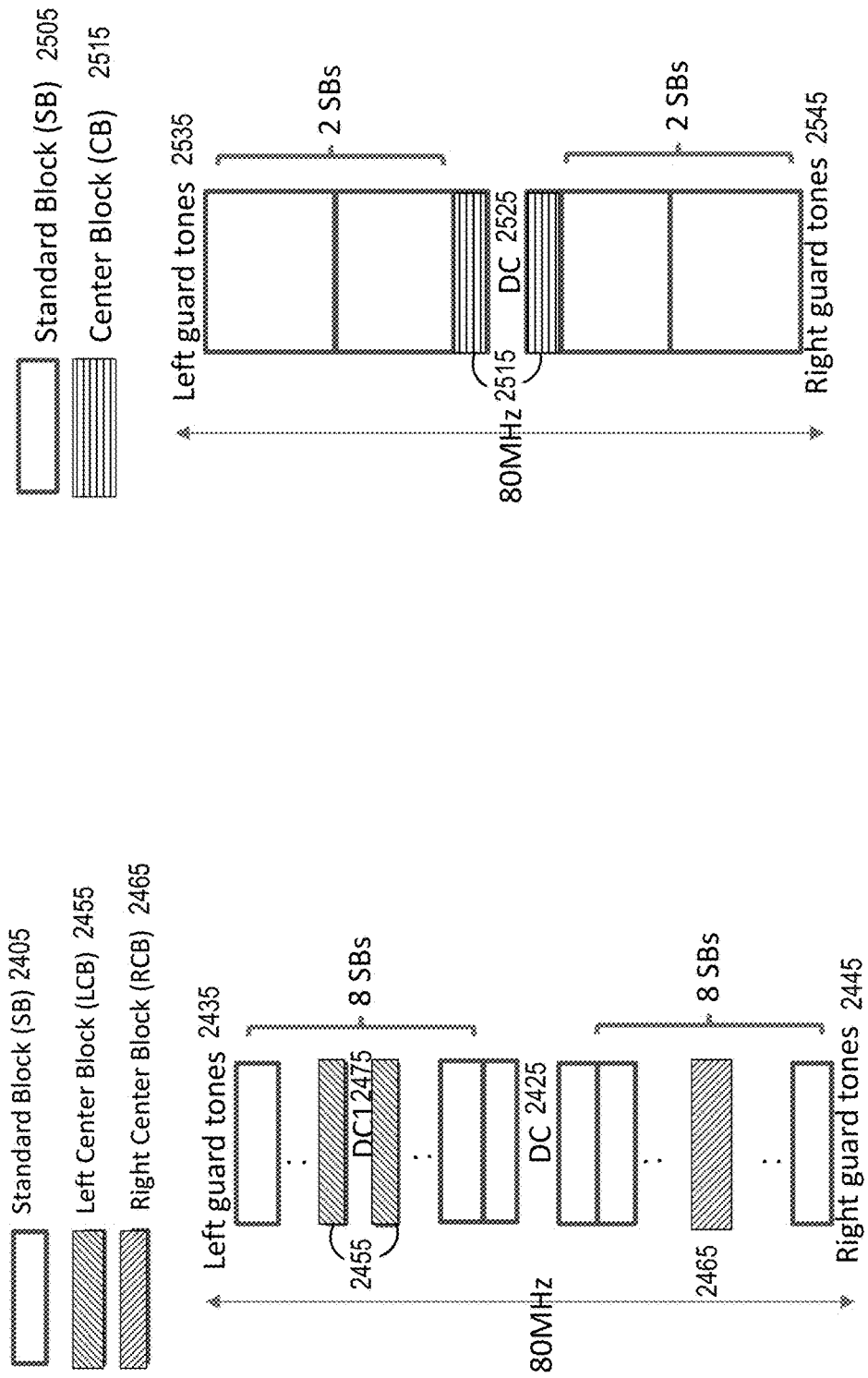
FIG. 24 is an illustration of a proposed allocation for an 80 MHz transmission.
FIG. 25 is an illustration of another proposed allocation for an 80 MHz transmission.

FIG. 24 illustrates another proposed allocation for an 80 MHz transmission. This allocation may be used to preserve a boundary for 20+20+40 MHz, that is, the boundary at the DC 2425 and DC1 2475 tones. As before, if the values for LCB 2455 and RCB 2465, and for DC1 2475 and DC2 are switched, this tone allocation may also be used to preserve the DC 2425 and DC2 boundaries. An 80 MHz transmission may include 1024 tones, and each tone may have an index number from −512 (at the top of the figure) to +511 (at the bottom of the figure). Of these tones, 12 may be used as guard tones (including left guard tones 2435 and right guard tones 2445), and 11 may be used as DC tones 2425. Further, 11 tones may be used for DC1 tones 2475. This may allow for a SB size of 114 tones to be used, and the transmission may include 8 SBs 2405. Generally, transmitting 114 tones may use an existing tone plan, which is included as part of the IEEE 802.11ac and/or IEEE 802.11ah standard. This allocation may have an LCB 2455 with 34 tones, with half of those tones on each side of the DC1 tones 2475 and an RCB 2465 with 44 tones. Note that LCB+RCB together may fit three 26 tone allocations. These blocks (LCB 2455, RCB 2465 and SBs 2405) may be allocated between one, two, three, or more users in various combinations, in order to allocate the tones to the different numbers of devices and in different amounts. For example, each SB 2405 and the LCB+RCB may be allocated to a single user, using new 1024FFT numerology.

FIG. 25 illustrates another proposed allocation for an 80 MHz transmission. This allocation may be used to preserve a boundary for 40+40 MHz, that is, the boundary at the DC tones 2525. An 80 MHz transmission may include 1024 tones, and each tone may have an index number from −512 (at the top of the figure) to +511 (at the bottom of the figure). Of these tones, 14 may be used as guard tones (including left guard tones 2535 and right guard tones 2545), and 14 may be used as DC tones 2525. This may allow for a SB size of 242 tones to be used, and the transmission may include 4 SBs 2505. Generally, transmitting 242 tones may use an existing tone plan, which is included as part of the IEEE 802.11ac and/or IEEE 802.11ah standard. This allocation may have a CB 2515 with 28 tones, with half of those tones on each side of the DC tones 2525. Note that CB 2515 may fit two 14 tone allocations. These blocks (CB 2515 and SBs 2505) may be allocated between one, two, three, or more users in various combinations, in order to allocate the tones to the different numbers of devices and in different amounts. For example, each SB 2505 and the CB 2515 may be allocated to a single user, using new 1024FFT numerology.

FIG. 25 also illustrates another proposed allocation for an 80 MHz transmission. This allocation may be used to preserve a boundary for 40+40 MHz, that is, the boundary at the DC tones 2525. An 80 MHz transmission may include 1024 tones, and each tone may have an index number from −512 (at the top of the figure) to +511 (at the bottom of the figure). Of these tones, 15 may be used as guard tones (including left guard tones 2535 and right guard tones 2545), and 15 may be used as DC tones 2525. This may allow for a SB size of 242 tones to be used, and the transmission may include 4 SBs 2505. Generally, transmitting 242 tones may use an existing tone plan, which is included as part of the IEEE 802.11ac and/or IEEE 802.11ah standard. This allocation may have a CB 2515 with 26 tones, with half of those tones on each side of the DC tones 2525. Note that CB 2515 may fit one 26 tone allocation. These blocks (CB 2515 and SBs 2505) may be allocated between one, two, three, or more users in various combinations, in order to allocate the tones to the different numbers of devices and in different amounts. For example, each SB 2505 and the CB 2515 may be allocated to a single user, using new 1024FFT numerology.

Figures 26, 27:
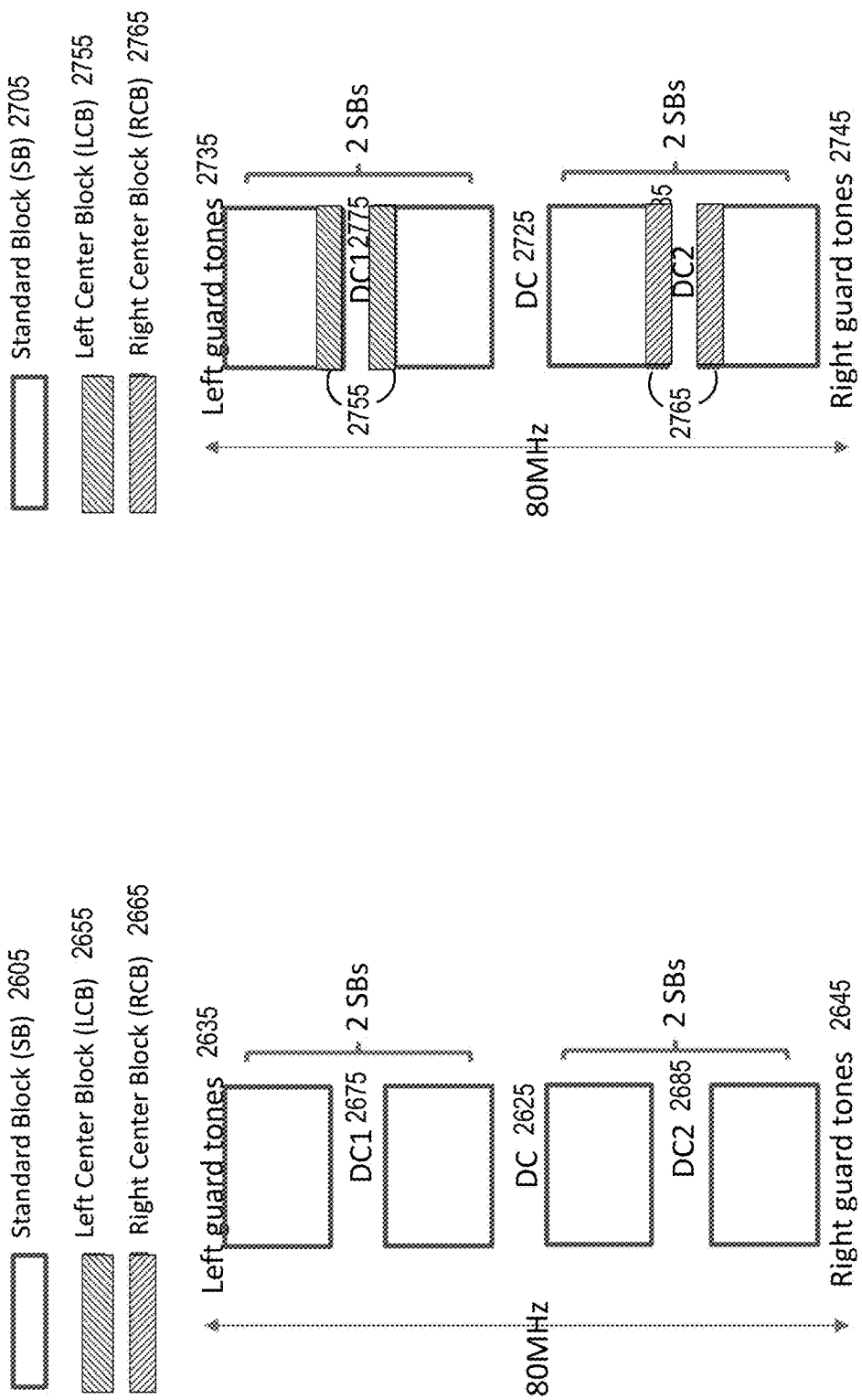
FIG. 26 is an illustration of a proposed allocation for an 80 MHz transmission.
FIG. 27 is an illustration of another proposed allocation for an 80 MHz transmission.

FIG. 26 illustrates another proposed allocation for an 80 MHz transmission. This allocation may be used to preserve a boundary for 20+20+20+20 or 20+40+20 MHz, that is, the boundary at the DC tones 2625. An 80 MHz transmission may include 1024 tones, and each tone may have an index number from −512 (at the top of the figure) to +511 (at the bottom of the figure). Of these tones, 14 may be used as guard tones (including left guard tones 2635 and right guard tones 2645), and 14 may be used as DC tones 2625. There may also be 14 DC1 tones 2675, and 14 DC2 tones 2685. This may allow for a SB size of 242 tones to be used, and the transmission may include 4 SBs 2605. Generally, transmitting 242 tones may use an existing tone plan, which is included as part of the IEEE 802.11ac and/or IEEE 802.11ah standard. These SBs 2605 may be allocated between one, two, three, or more users in various combinations, in order to allocate the tones to the different numbers of devices and in different amounts. For example, each SB 2605 may be allocated to a single user, using new 1024FFT numerology. There may be no LCB 2655 or RCB 2665 in this allocation.

FIG. 27 illustrates another proposed allocation for an 80 MHz transmission. This allocation may be used to preserve a boundary for 20+40+20 MHz, that is, the boundary at the DC tones 2725. An 80 MHz transmission may include 1024 tones, and each tone may have an index number from −512 (at the top of the figure) to +511 (at the bottom of the figure). Of these tones, 11 may be used as guard tones (including left guard tones 2735 and right guard tones 2745), and 9 may be used as DC tones 2725. There may also be 11 DC1 tones 2775, and 11 DC2 tones 2785. This may allow for a SB size of 242 tones to be used, and the transmission may include 4 SBs 2705. This allocation may have an LCB 2755 with 7 tones around DC1 2775, and an RCB 2765 with 7 tones around DC2 2785. Generally, transmitting 242 tones may use an existing tone plan, which is included as part of the IEEE 802.11ac and/or IEEE 802.11ah standard. Note that LCB+RCB, together, may fit one 14 tone allocation. These blocks (LCB 2755, RCB 2765 and SBs 2705) may be allocated between one, two, three, or more users in various combinations, in order to allocate the tones to the different numbers of devices and in different amounts. For example, each SB 2705 and the LCB+RCB may be allocated to a single user, using new 1024FFT numerology.

FIG. 28 illustrates another proposed allocation for an 80 MHz transmission. This allocation may be used to preserve a boundary for 20+20+40 MHz, that is, the boundary at the DC 2825 and DC1 2875 tones. As before, by switching the values for LCB 2855 and RCB 2865, and for DC1 2875 and DC2, this allocation may alternatively protect the boundaries at the DC 2825 and DC2 tones. An 80 MHz transmission may include 1024 tones, and each tone may have an index number from −512 (at the top of the figure) to +511 (at the bottom of the figure). Of these tones, 14 may be used as guard tones (including left guard tones 2835 and right guard tones 2845), and 14 may be used as DC tones 2825 (at [−7:6] or [−6:7]). This may allow for a SB size of 242 tones to be used, and the transmission may include 4 SBs 2805. Generally, transmitting 242 tones may use an existing tone plan, which is included as part of the IEEE 802.11ac and/or IEEE 802.11ah standard. This allocation may have an RCB 2865 with 14 tones. Note that the RCB 2865 may fit one 14 tone allocation. These blocks (RCB 2865 and SBs 2805) may be allocated between one, two, three, or more users in various combinations, in order to allocate the tones to the different numbers of devices and in different amounts. For example, each SB 2805 and the RCB 2865 may be allocated to a single user, using new 1024FFT numerology.

FIG. 29 illustrates another proposed allocation for an 80 MHz transmission. This allocation may be used to preserve a boundary for 40+40 MHz, that is, the boundary at the DC tones 2925. An 80 MHz transmission may include 1024 tones, and each tone may have an index number from −512 (at the top of the figure) to +511 (at the bottom of the figure). Of these tones, 17 or 15 may be used as guard tones (including left guard tones 2935 and right guard tones 2945), and 11 or 13 may be used as DC tones 2925. This may allow for a SB size of 484 tones to be used, and the transmission may include 2 SBs 2905. Generally, transmitting 484 tones may use an existing tone plan, which is included as part of the IEEE 802.11ac and/or IEEE 802.11ah standard. This allocation may have a CB 2915 with 28 tones. Note that the CB 2915 may fit two 14 tone allocations. These blocks (CB 2915 and SBs 2905) may be allocated between one, two, three, or more users in various combinations, in order to allocate the tones to the different numbers of devices and in different amounts. For example, each SB 2905 and the CB 2915 may be allocated to a single user, using new 1024FFT numerology.

FIG. 29 also illustrates another proposed allocation for an 80 MHz transmission. This allocation may be used to preserve a boundary for 40+40 MHz, that is, the boundary at the DC tones 2925. An 80 MHz transmission may include 1024 tones, and each tone may have an index number from −512 (at the top of the figure) to +511 (at the bottom of the figure). Of these tones, 19 or 17 may be used as guard tones (including left guard tones 2935 and right guard tones 2945), and 11 or 13 may be used as DC tones 2925. This may allow for a SB size of 484 tones to be used, and the transmission may include 2 SBs 2905. Generally, transmitting 484 tones may use an existing tone plan, which is included as part of the IEEE 802.11ac and/or IEEE 802.11ah standard. This allocation may have a CB 2915 with 26 tones. Note that the CB 2915 may fit one 26 tone allocation. These blocks (CB 2915 and SBs 2905) may be allocated between one, two, three, or more users in various combinations, in order to allocate the tones to the different numbers of devices and in different amounts. For example, each SB 2905 and the CB 2915 may be allocated to a single user, using new 1024FFT numerology.

Figure 30:
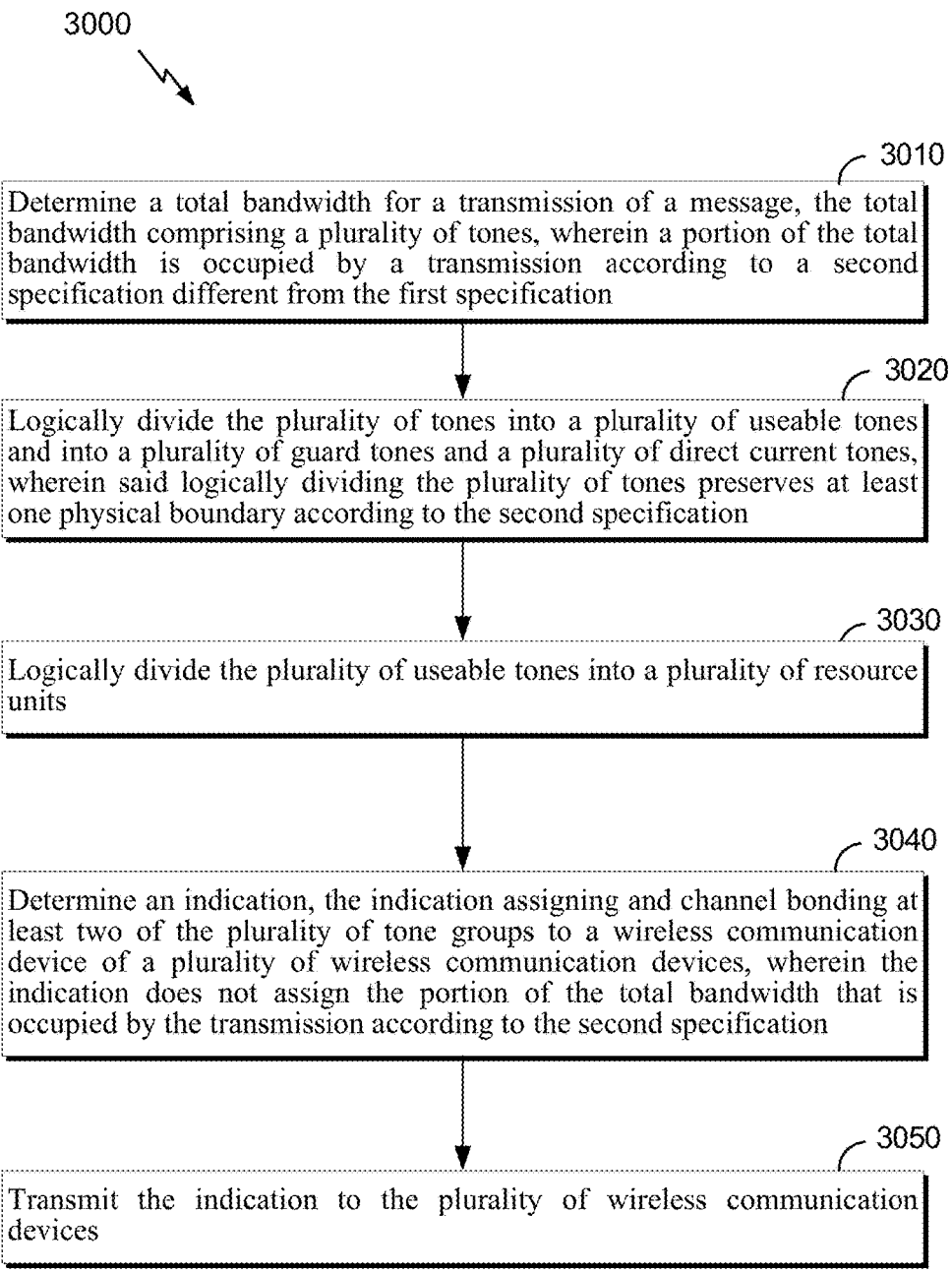
FIG. 30 shows a flowchart for an exemplary method of communicating over a wireless communication network.

FIG. 30 shows a flowchart 3000 for an exemplary method of communicating over a wireless communication network. The method can be implemented in whole or in part by the devices described herein, such as the wireless device 202 shown in FIG. 2 or the AP 104 shown in FIG. 1. Although the illustrated method is described herein with reference to the wireless communication system 100 discussed above with respect to FIG. 1, and one exemplary tone plan discussed above with respect to FIG. 28, a person having ordinary skill in the art will appreciate that the illustrated method can be implemented by another device or transmission described herein, or any other suitable device or transmission. Although the illustrated method is described herein with reference to a particular order, in various embodiments, blocks herein can be performed in a different order, or omitted, and additional blocks can be added. This method may be used to divide a bandwidth between a number of different devices, in order to allow those devices to transmit or receive an uplink or a downlink OFDMA transmission.

At block 3010, the AP 104 determines a total bandwidth for a transmission of a message according to a first specification, the total bandwidth comprising a plurality of tones. For example, this bandwidth may be one of 20 MHz, 40 MHz, or 80 MHz. In one example shown in FIG. 28, the illustrated total bandwidth is 80 MHz. A portion of the total bandwidth is occupied by a transmission according to a second specification different from the first specification. For example, in one embodiment, the AP 104 can be able to sense the entire 80 MHz BW and finds the 2nd physical 20 MHz is occupied by a legacy transmission 2890 (which can be a legacy transmission referring to any transmission according to a specification different from the specification employed by an implementing device). In some aspects, the plurality of tones includes a number of useable tones which may be used as data or pilot tones, and the message can further include guard tones and direct current tones. In some aspects, the means for determining may include a processor.

In various embodiments, the first specification can include an Institute of Electrical and Electronics Engineers (IEEE) 802.11ax specification. The second specification can include a different IEEE 802.11 specification. For example, the second specification can include IEEE 802.11a, 802.11b, 802.11n, 802.11ac, and so forth. In other embodiments, the first specification can include an IEEE 802.11 specification other than 802.11ax.

At block 3020, the AP 104 logically divides the plurality of tones into a plurality of useable tones and into a plurality of guard tones and a plurality of direct current tones, to form a tone plan that preserves at least one physical boundary according to the second specification. For example, the useable tones may include tones that may be used as data tones and/or pilot tones. The guard tones may include tones which are placed at the edge of a transmission, such as tones labeled left guard tones and right guard tones in FIGS. 3-29. The direct current tones may include the DC tones, as well as DC1 and DC2 tones as illustrated in FIGS. 3-29. With respect to FIG. 29, for example, the AP 104 can allocate the left guard tones 2835, DC tones 2875 and 2825, and right guard tones 2845 to form a tone plan that preserves the illustrated 20 MHz and 40 MHz legacy physical channel boundaries. The means for logically dividing may include a processor. For example, the plurality of direct current tones may include tones allocated as direct current tones in an 80 MHz transmission, the tones in a group centered on one of tone index −256 or tone index 256 (that is, DC1 and DC2 tones, respectively).

In various embodiments, logically dividing the plurality of tones can include assigning sufficient guard tones to preserve physical 20 MHz and/or 40 MHz boundaries. For example, the AP 104 can preserve the physical 20/40 MHz boundaries according to the second specification. In various embodiments, logically dividing the plurality of tones can include assigning 11 direct current or guard tones at 20 MHz and/or 40 MHz boundaries. For example, the AP 104 can assign 11 DC tones at physical 20/40 MHz boundaries. As another example, the AP 104 can assign 11 guard tones at physical 20/40 MHz boundaries.

At block 3030, the AP 104 logically divides the plurality of useable tones in the total bandwidth into a plurality of resource units. In some aspects, this division may be done according to one of the tone plans found in FIGS. 3-29. For example, logically dividing may include logically dividing a number of tones into equal-sized standard blocks, and then allocating leftover tones into one or more of a center block, a left center block, and a right center block. In some aspects, the means for logically dividing may include a processor.

With respect to FIG. 28, for example, the AP 104 can form a tone plan that provides usable tones in any of the blocks 2805, 2855, and 2865 as resource units. In some aspects, the means for allocating may include a processor. For example, logically dividing the plurality of useable tones into a plurality of resource units can include logically dividing the plurality of useable tones into a plurality of resource units and allocating a number of tones in the plurality of tones that are not in any resource unit into one or more of a center block, a left center block, and a right center block. Generally, an indication can further assign at least a portion of one of a center block, a left center block, and a right center block to the wireless communication device of the plurality of wireless communication devices. In some aspects, tones from one or more of the center block, the left center block, and the right center block may be used for channel control.

In various embodiments, logically dividing the plurality of useable tones can include assigning resource units that preserve physical 20 MHz and/or 40 MHz boundaries. For example, the AP 104 can adjust the resource units in order to accommodate the physical 20/40 MHz boundaries preserved in block 3020 above.

At block 3040, the AP 104 determines an indication, the indication assigning and channel bonding at least two of the plurality of resource units to a wireless communication device of a plurality of wireless communication devices. The indication does not assign the portion of the total bandwidth that is occupied by the transmission according to the second specification. For example, in one embodiment, the AP 104 can schedule transmission in (the 1st, 3rd, and 4th physical 20 MHz). To do so, it can preserve enough guard tones (at blocks 3020 and/or 3030) adjacent to the 2nd physical 20 MHz. In this example, because the 20+40 MHz channels are scheduled together, they can be referred to as channel bonded. With respect to FIG. 28, in an example where the AP 104 allocates a plurality of resource units to the same station, those resource units can be said to be channel bonded. In various embodiments, channel bonded resource units can be contiguous or non-contiguous. In some aspects, the means for determining may include a processor.

At block 3050, the AP 104 transmits the indication to the plurality of wireless communication devices. In some aspects, this indication may be a trigger message which may trigger and UL OFDMA transmission. For example, this message may be transmitted to a number of wireless devices, informing those devices of their allocated tones, and of other information, such as a timing of the UL OFDMA transmission. Accordingly, those devices may be configured to transmit the UL OFDMA transmission based, at least in part, on information found in the indication. In some aspects, this indication may be a packet header of a downlink message. For example, a DL OFDMA message may include a packet header, and the indication may be included as part of that packet header. In some aspects, the means for transmitting may include a transmitter. In other embodiments, the indication can be a beacon or IE.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array (FPGA) signal or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of communicating over a wireless communication network, the method comprising:
    determining a total bandwidth for a transmission of a message according to a first specification, the total bandwidth comprising a plurality of tones, wherein a portion of the total bandwidth is occupied by a transmission according to a second specification different from the first specification;
    logically dividing the plurality of tones between a plurality of useable tones, a plurality of guard tones, and a plurality of direct current tones, to form a tone plan that preserves at least one physical boundary according to the second specification;
    logically dividing the plurality of useable tones between a plurality of resource units and one or more of a center block, a left center block, and a right center block, wherein tones from the plurality of useable tones allocated to at least one of the one or more of the center block, the left center block, and the right center block are located on both sides of the at least one physical boundary;
    determining an indication, the indication assigning and channel bonding at least two of the plurality of resource units to a wireless communication device of a plurality of wireless communication devices and at least a portion of one of the center block, the left center block, and the right center block to another wireless communication device of the plurality of wireless communication devices, wherein the indication does not assign the portion of the total bandwidth that is occupied by the transmission according to the second specification; and
    transmitting the indication to the plurality of wireless communication devices.

2. The method of claim 1, wherein the first specification comprises an Institute of Electrical and Electronics Engineers (IEEE) 802.11ax specification and the second specification comprises a different IEEE 802.11 specification.

3. The method of claim 1, wherein said logically dividing the plurality of tones comprises assigning sufficient guard tones to preserve physical 20 MHz and/or 40 MHz boundaries.

4. The method of claim 1, wherein said logically dividing the plurality of tones comprises assigning 11 direct current or guard tones at 20 MHz and/or 40 MHz boundaries.

5. The method of claim 1, wherein said logically dividing the plurality of useable tones comprises assigning resource units that preserve physical 20 MHz and/or 40 MHz boundaries.

6. The method of claim 1, wherein the plurality of direct current tones includes tones allocated as direct current tones in an 80 MHz transmission, the tones in a group centered on one of tone index −256 or tone index 256.

7. The method of claim 1, wherein the tones from one or more of the center block, the left center block, and the right center block are used for channel control.

8. An apparatus for wireless communication, comprising:
    a processing system configured to:
        determine a total bandwidth for a transmission of a message according to a first specification, the total bandwidth comprising a plurality of tones, wherein a portion of the total bandwidth is occupied by a transmission according to a second specification different from the first specification;
        logically divide the plurality of tones between a plurality of useable tones, a plurality of guard tones, and a plurality of direct current tones, to form a tone plan that preserves at least one physical boundary according to the second specification;
        logically divide the plurality of useable tones between a plurality of resource units and one or more of a center block, a left center block, and a right center block, wherein tones from the plurality of useable tones allocated to at least one of the one or more of the center block, the left center block, and the right center block are located on both sides of the at least one physical boundary;
        determine an indication, the indication assigning and channel bonding at least two of the plurality of resource units to a wireless communication device of a plurality of wireless communication devices and at least a portion of one of the center block, the left center block, and the right center block to another wireless communication device of the plurality of wireless communication devices, wherein the indication does not assign the portion of the total bandwidth that is occupied by the transmission according to the second specification; and
    a transmitter configured to transmit the indication to the plurality of wireless communication devices.

9. The apparatus of claim 8, wherein the first specification comprises an Institute of Electrical and Electronics Engineers (IEEE) 802.11ax specification and the second specification comprises a different IEEE 802.11 specification.

10. The apparatus of claim 8, wherein the processing system is configured to logically divide the plurality of tones by assigning sufficient guard tones to preserve physical 20 MHz and/or 40 MHz boundaries.

11. The apparatus of claim 8, wherein the processing system is configured to logically divide the plurality of tones by assigning 11 direct current or guard tones at 20 MHz and/or 40 MHz boundaries.

12. The apparatus of claim 8, wherein the processing system is configured to logically divide the plurality of useable tones by assigning resource units that preserve physical 20 MHz and/or 40 MHz boundaries.

13. The apparatus of claim 8, wherein the plurality of direct current tones includes tones allocated as direct current tones in an 80 MHz transmission, the tones in a group centered on one of tone index −256 or tone index 256.

14. The apparatus of claim 8, wherein the tones from one or more of the center block, the left center block, and the right center block are used for channel control.

15. An apparatus for wireless communication, comprising:
- means for determining a total bandwidth for a transmission of a message according to a first specification, the total bandwidth comprising a plurality of tones, wherein a portion of the total bandwidth is occupied by a transmission according to a second specification different from the first specification;
- means for logically dividing the plurality of tones between a plurality of useable tones, a plurality of guard tones, and a plurality of direct current tones, to form a tone plan that preserves at least one physical boundary according to the second specification;
- means for logically dividing the plurality of useable tones between a plurality of resource units and one or more of a center block, a left center block, and a right center block, wherein tones from the plurality of useable tones allocated to at least one of the one or more of the center block, the left center block, and the right center block are located on both sides of the at least one physical boundary;
- means for determining an indication, the indication assigning and channel bonding at least two of the plurality of resource units to a wireless communication device of a plurality of wireless communication devices and at least a portion of one of the center block, the left center block, and the right center block to another wireless communication device of the plurality of wireless communication devices, wherein the indication does not assign the portion of the total bandwidth that is occupied by the transmission according to the second specification; and
- means for transmitting the indication to the plurality of wireless communication devices.

16. The apparatus of claim 15, wherein the first specification comprises an Institute of Electrical and Electronics Engineers (IEEE) 802.11ax specification and the second specification comprises a different IEEE 802.11 specification.

17. The apparatus of claim 15, wherein means for logically dividing the plurality of tones comprises means for assigning sufficient guard tones to preserve physical 20 MHz and/or 40 MHz boundaries.

18. The apparatus of claim 15, wherein means for logically dividing the plurality of tones comprises means for assigning 11 direct current or guard tones at 20 MHz and/or 40 MHz boundaries.

19. The apparatus of claim 15, wherein means for logically dividing the plurality of useable tones comprises means for assigning resource units that preserve physical 20 MHz and/or 40 MHz boundaries.

20. The apparatus of claim 15, wherein the plurality of direct current tones includes tones allocated as direct current tones in an 80 MHz transmission, the tones in a group centered on one of tone index −256 or tone index 256.

21. The apparatus of claim 15, wherein the tones from one or more of the center block, the left center block, and the right center block are used for channel control.

22. A non-transitory computer-readable medium comprising code that, when executed, causes an apparatus to:
- determine a total bandwidth for a transmission of a message according to a first specification, the total bandwidth comprising a plurality of tones, wherein a portion of the total bandwidth is occupied by a transmission according to a second specification different from the first specification;
- logically divide the plurality of tones between a plurality of useable tones, a plurality of guard tones, and a plurality of direct current tones, to form a tone plan that preserves at least one physical boundary according to the second specification;
- logically divide the plurality of useable tones between a plurality of resource units and one or more of a center block, a left center block, and a right center block, wherein tones from the plurality of useable tones allocated to at least one of the one or more of the center block, the left center block, and the right center block are located on both sides of the at least one physical boundary;
- determine an indication, the indication assigning and channel bonding at least two of the plurality of resource units to a wireless communication device of a plurality of wireless communication devices and at least a portion of one of the center block, the left center block, and the right center block to another wireless communication device of the plurality of wireless communication devices, wherein the indication does not assign the portion of the total bandwidth that is occupied by the transmission according to the second specification; and
- transmit the indication to the plurality of wireless communication devices.

23. The medium of claim 22, wherein the first specification comprises an Institute of Electrical and Electronics Engineers (IEEE) 802.11ax specification and the second specification comprises a different IEEE 802.11 specification.

24. The medium of claim 22, wherein said logically dividing the plurality of tones comprises assigning sufficient guard tones to preserve physical 20 MHz and/or 40 MHz boundaries.

25. The medium of claim 22, wherein said logically dividing the plurality of tones comprises assigning 11 direct current or guard tones at 20 MHz and/or 40 MHz boundaries.

26. The medium of claim 22, wherein said logically dividing the plurality of useable tones comprises assigning resource units that preserve physical 20 MHz and/or 40 MHz boundaries.

27. The medium of claim 22, wherein the plurality of direct current tones includes tones allocated as direct current tones in an 80 MHz transmission, the tones in a group centered on one of tone index −256 or tone index 256.

28. The medium of claim 22, wherein the tones from one or more of the center block, the left center block, and the right center block are used for channel control.

* * * * *